(12) United States Patent
Goergen et al.

(10) Patent No.: US 7,949,134 B2
(45) Date of Patent: May 24, 2011

(54) MULTIPLEXED MULTILANE HYBRID SCRAMBLED TRANSMISSION CODING

(75) Inventors: Joel Goergen, Maple Grove, MN (US); Krishnamurthy Subramanian, Mountain View, CA (US); Ann Gui, Cupertino, CA (US)

(73) Assignee: Force 10 Networks, Inc., San Jose, CA (US)

( * ) Notice: Subject to any disclaimer, the term of this patent is extended or adjusted under 35 U.S.C. 154(b) by 883 days.

(21) Appl. No.: 11/975,003

(22) Filed: Oct. 17, 2007

(65) Prior Publication Data

US 2009/0034728 A1 Feb. 5, 2009

Related U.S. Application Data

(60) Provisional application No. 60/962,813, filed on Aug. 1, 2007.

(51) Int. Cl.
*H04L 9/00* (2006.01)

(52) U.S. Cl. .................................................. 380/268

(58) Field of Classification Search .................. 380/268
See application file for complete search history.

(56) References Cited

U.S. PATENT DOCUMENTS

| | | | | |
|---|---|---|---|---|
| 4,755,987 A * | 7/1988 | Lee et al. | ...................... | 370/479 |
| 5,086,470 A * | 2/1992 | Ballance | ...................... | 380/267 |
| 6,510,229 B1 * | 1/2003 | Geile | ............................ | 380/235 |
| 6,650,638 B1 * | 11/2003 | Walker et al. | ................. | 370/389 |
| 7,154,902 B1 * | 12/2006 | Sikdar | ........................... | 370/412 |
| 2003/0161471 A1* | 8/2003 | Jou et al. | ....................... | 380/268 |

* cited by examiner

*Primary Examiner* — Benjamin E Lanier
*Assistant Examiner* — Cordelia Zecher
(74) *Attorney, Agent, or Firm* — Robert Schuler

(57) ABSTRACT

In one embodiment, a hybrid backplane coding scheme transmits data using lengthy sequences of scrambled data, separated by 8b/10b control character sequences that prepare the receiver for the next scrambled sequence and permit realignment if necessary. Several lanes are coded separately in this manner, and then multiplexed on a common channel. Alignment sequences in the control character sequences, as well as scrambler seeds, are set to avoid synchronization of patterns generated among all lanes, which would tend to confuse a receiving serdes and/or phase-locked loop that recovers timing from the multiplexed scrambled signals.

35 Claims, 12 Drawing Sheets

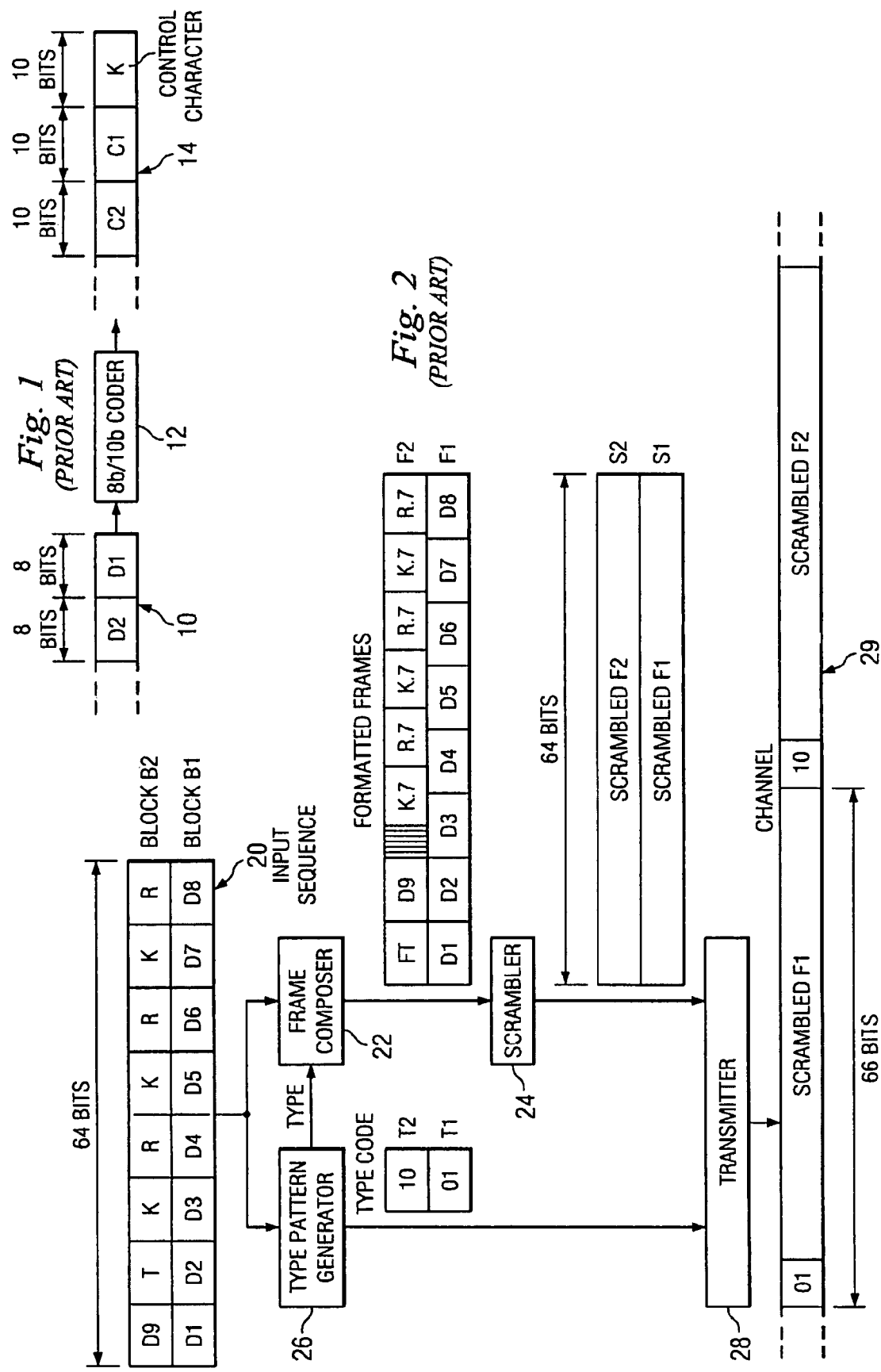

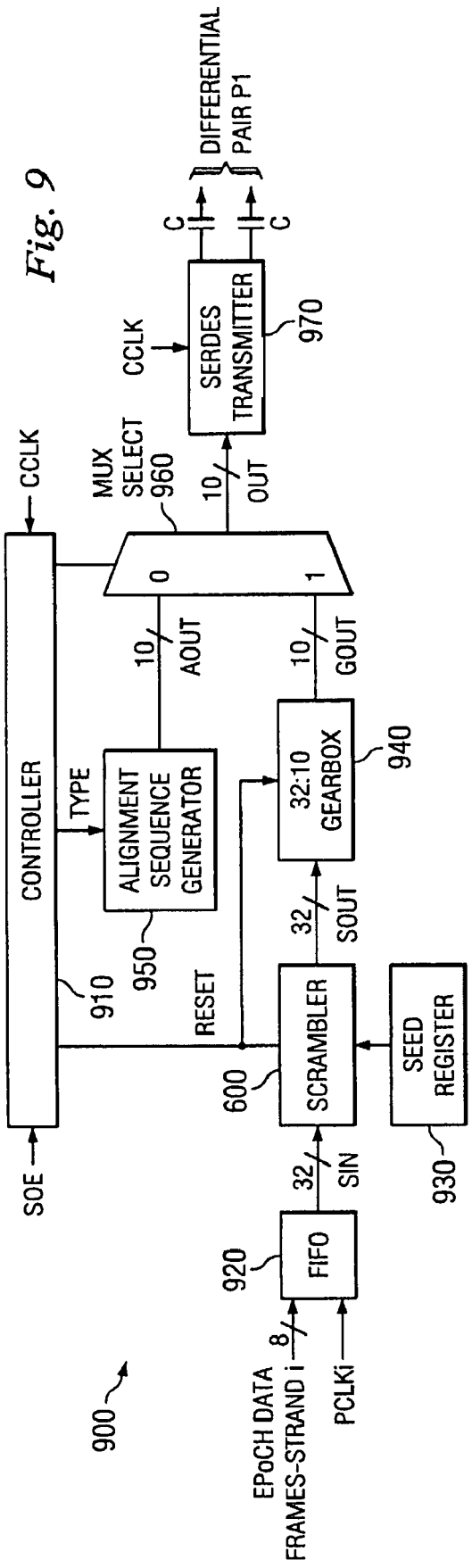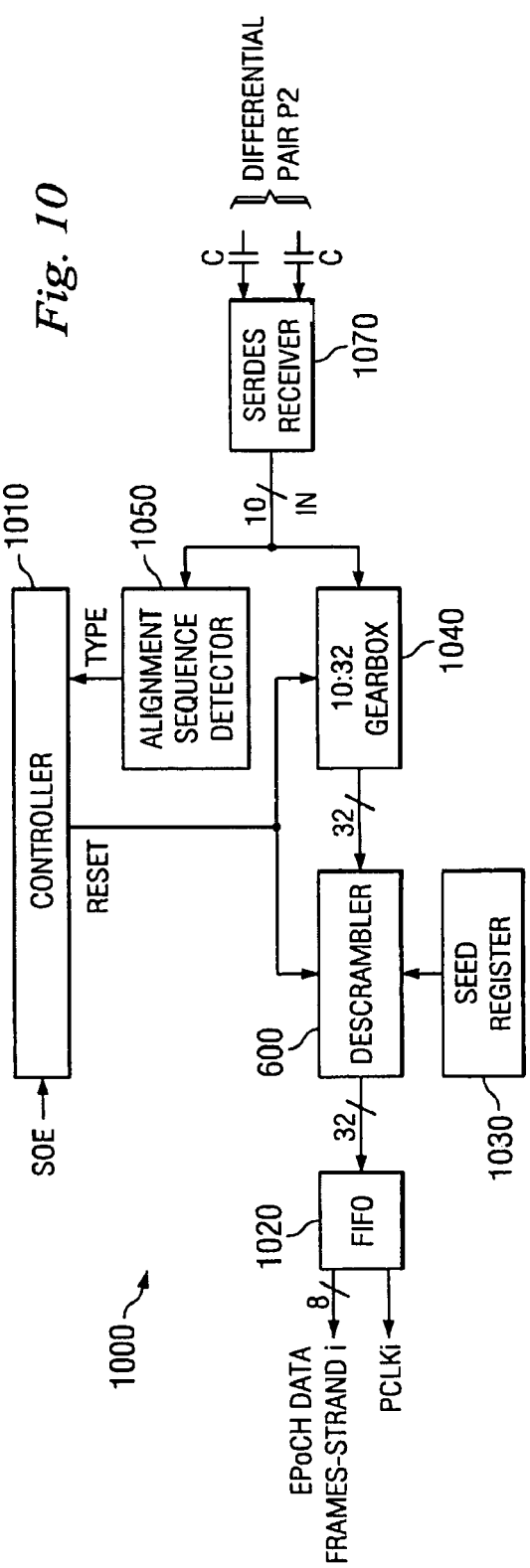

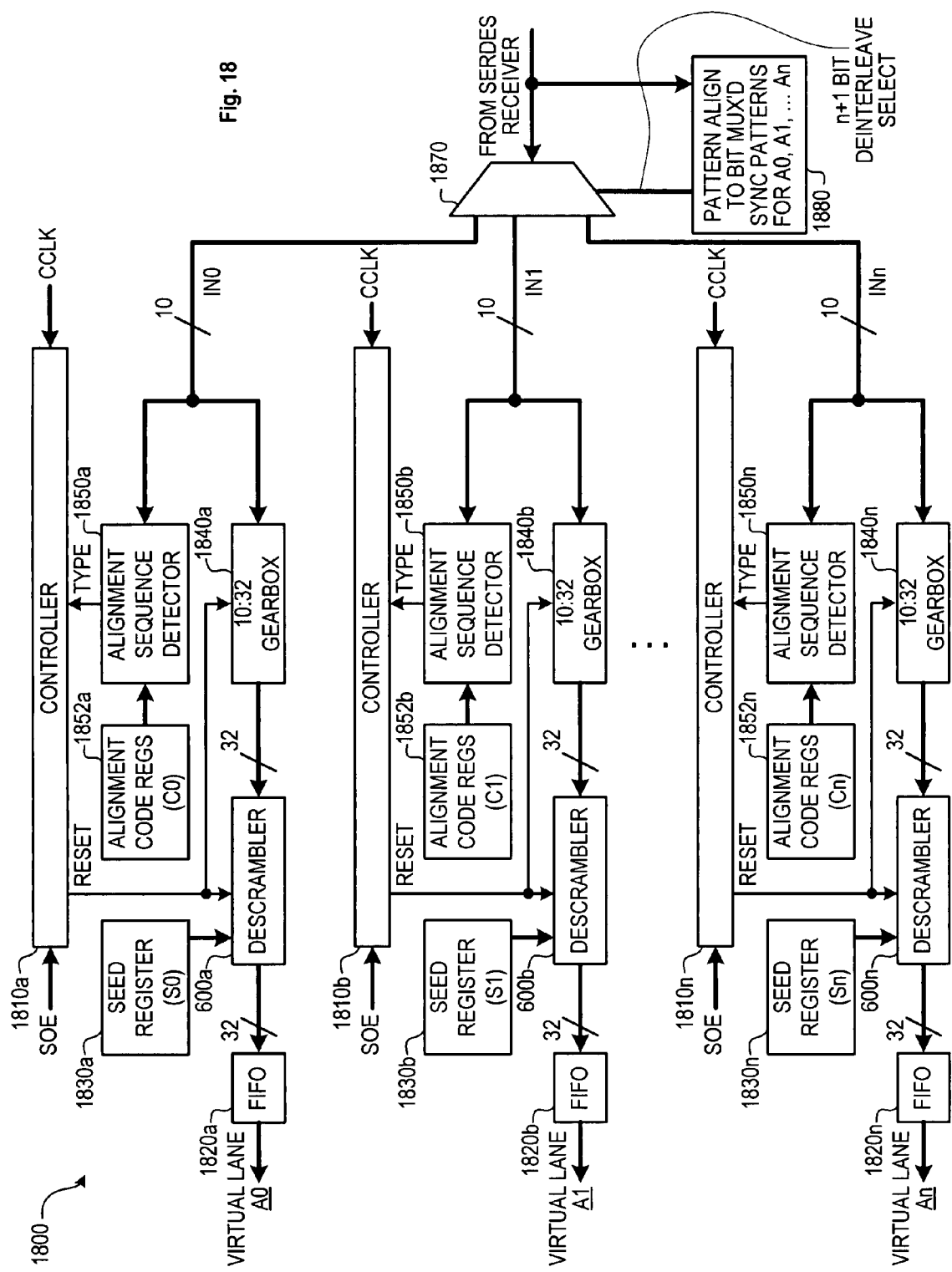

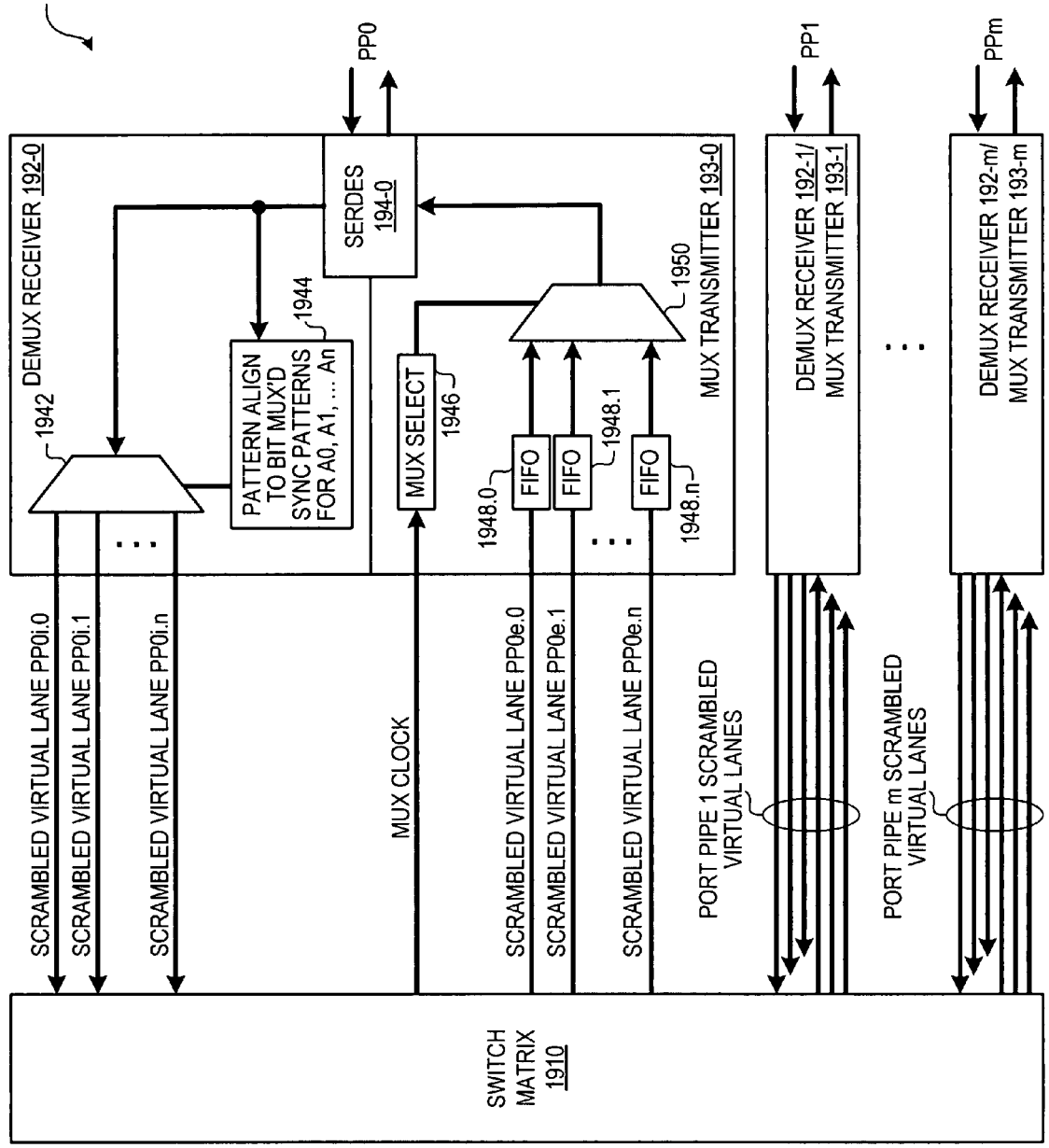

MULTIPLEXED MULTILANE HYBRID SCRAMBLED TRANSMISSION CODING

CROSS REFERENCE TO RELATED APPLICATIONS

This application claims priority to U.S. Patent Application Ser. No. 60/962,813, filed Aug. 1, 2007, which is incorporated herein by reference in its entirety.

BACKGROUND

1. Field of the Invention

This invention relates generally to high-speed digital data transmission, and more particularly to a coding and framing method for digital data transmission.

2. Description of Related Art

Digital data is often transmitted from one device to another device as a digital sequence. In its simplest form, a digital sequence is a transmission pattern formed using a time sequence made up of "pulses" of two signal types, representing two binary symbols (a zero and a one). In an electrical transmission system, the sender may send one voltage to represent zero, and another voltage to represent one, each bit represented by the appropriate voltage during its corresponding bit time. Such a system can also be differential, i.e., a pair of electrical conductors is used, with one of the pair sending the opposite signal as the other of the pair, both conductors active during each bit time. By detecting and differentiating between the two signal types sent by the sender and recovering the timing of a transmitted sequence, a receiver can reconstruct the original digital data sequence.

Since from a flexibility standpoint the digital data input sequence is preferably unconstrained as to its content, some allowable input sequences may cause problems at the receiver if sent without modification. For instance, if the receiver is to recover timing information from the transmitted data, a certain number of data transitions (one to zero or zero to one) per unit time are required. A long string of zeros or ones in the input data may allow the receiver timing to drift, causing bit errors. Also, if an electrically transmitted signal is not dc-balanced (i.e., an equal numbers of zeros and ones are transmitted over time), the transmitter and receiver cannot be dc-coupled, or else the signal levels representing a zero and a one will drift. Further, were the channel susceptible to any of these conditions, a malicious sender could intentionally attack the transmission system by sending a data sequence with a pattern designed to confuse the receiver.

To solve these and other problems (such as how to detect and/or correct transmission errors at the receiver), many digital data transmission systems employ transmission coding. The transmission code adds some overhead bits and/or characters to the input sequence, and manipulates the input sequence to avoid one or more of the aforementioned problems.

One transmission code in wide use today is the 8b/10b transmission code as disclosed by Franaszek and Widmer in U.S. Pat. No. 4,486,739, "Byte Oriented DC Balanced (0,4) 8b/10b Partitioned Block Transmission Code." The 8b/10b transmission code ("8b/10b code") accepts an input sequence of eight-bit blocks, and transforms each eight-bit block into a ten-bit codeword. Each ten-bit codeword contains either six ones and four zeros, five ones and five zeros, or four ones and six zeros, with a maximum design spacing between adjacent zero-to-one and one-to-zero transitions in each codeword to allow the receiver to maintain timing. Each input value that can be coded with a codeword having six ones and four zeros can also be coded with a codeword having four ones and six zeros. One of those two codewords is selected for transmission by a rule that nulls any running zero-to-one disparity in the transmitted sequence. By following the same rules as the transmitter, the receiver decodes the codewords to recover the eight-bit blocks of the input sequence.

The 8b/10b code also provides some ten-bit codewords that represent channel control characters. Some of these characters contain a "comma" property, i.e., they contain a bit pattern that can only occur within such a codeword and not across any two other consecutive characters. These comma characters are useful for instantaneous byte synchronization at the receiver. One pair of such control words are commonly referred to as "K" and "R", representing even and odd idle characters. Other typical control words include an align character "A", which can be used to align data transmitted on multiple parallel bit lanes.

One drawback associated with 8b/10b coding is its high coding overhead. For every eight-bit input value, ten bits are transmitted across the channel. Factoring in the added control words, more than 20% of the channel's physical bit capacity is consumed by the 8b/10b code overhead. FIG. 1 depicts a typical relationship between the input 10 to an 8b/10b coder 12, and the coder output 14 actually sent on the channel. Not only must 10 bits be allocated in the transmit channel for each coded version $C_n$ of an eight-bit data input value $D_n$, but control characters K also occupy significant numbers of bit times on the transmit channel.

For 10 Gb/s (gigabits/second) Ethernet, a different coding scheme is used to avoid the high coding overhead of the 8b/10b code. This coding scheme, commonly referred to as 64b/66b coding, is described by Walker et al. in European Patent Application EP 1133124A2, entitled "Coding for Packetized Serial Data." 64b/66b coding achieves a more efficient use of the channel than 8b/10b coding—for each 64-bit input block, only 66 bits are transmitted. The 66 bits comprises a two-bit block type code and 64 bits of scrambled data and control words.

Referring to FIG. 2, an input sequence 20 comprises 64-bit blocks B1 and B2. Block B1 contains only input data, more specifically eight data bytes D1-D8. A type pattern generator 26 detects that all bytes in block B1 are data, and therefore generates a data "type" to a frame composer 22 and a two-bit block type code T1 with a value "01" to a transmitter 28. A data type frame requires no transformation by frame composer 22, and therefore frame composer 22 sends the 64-bit data to a scrambler 24 as a formatted frame F1. Scrambler 24 uses an x58+x39+1 scrambler on formatted frame F1 to produce a 64-bit scrambled frame S1, which is also supplied to transmitter 28. Transmitter 28 prepends the two-bit block type code to the 64-bit scrambler output and transmits 66 bits on a channel 29. The receiver (not shown) at the opposite end of channel 29 interprets the two-bit block type code, and simply descrambles the following 64 bits to produce an input 64 bits descrambled frame. The two-bit block type code signifies that the descrambled frame comprises only data bytes.

When a 64-bit block contains one or more control words, such as block B2, coding and decoding complexity is increased. The block could contain all control words, or could contain mixed data and control words, as block B2 illustrates. A finite number (10) of different mixed data/control symbol arrangements are allowed, one of which (a single data symbol D9 followed by a packet termination symbol T and a string of other control symbols) is illustrated. In such a circumstance, type pattern generator 26 produces an eight-bit frame type code FT to frame composer 22 and a two-bit block type code T2 with a value "10"—opposite the code used for information-data only. The frame type code FT describes the ordering of information and control words in the 64-bit block, and also describes at least one control word. In this particular example, the frame type code FT describes the mixed data/control sequence consisting of one data word, followed by a termination symbol, followed by other control words. Frame type code FT is coded as the first eight bits of the 64-bit formatted frame F2 sent by frame composer 22 to scrambler 24. The second eight bits of F2 contain the single data word D9. The termination symbol is understood from the value of FT. The remaining six control words are coded as seven-bit control words and placed in specific locations in the remaining 48 bits of frame F2. Scrambler 24 scrambles block B2 to produced scrambled frame S2. Transmitter 28 prepends block type code T2 ("10") to scrambled block S2 and place the 66-bit frame on channel 29. The receiver interprets the "10" two-bit block type code as indicating that the block will require additional decoding after descrambling. The type code from the descrambled data is interpreted, allowing the receiver to restore the original 64 bits of control and information words from the descrambled data.

One difficulty with the 64b/66b code is that because 64 of every 66 bits are scrambled—and the 64 scrambled bits include the control code characters—the 64b/66b code has no "comma" control character that allows easy block synchronization of transmitter and receiver. As a result, it may take long periods of time involving hunting and guessing to synchronize or resynchronize the channel should the channel become desynchronized.

BRIEF DESCRIPTION OF THE DRAWINGS

The invention may be best understood by reading the disclosure with reference to the drawings, wherein:

FIG. 1 contains an illustration of 8b/10b channel coding;

FIG. 2 contains a block diagram of a 64b/66b channel coder and an illustration of 64b/66b channel coding;

FIGS. 9 and 10 contain, respectively, a hybrid channel coder and hybrid channel decoder useful with the hybrid backplane channel coding format of FIG. 5;

FIGS. 17 and 18 contain, respectively, a hybrid channel coder and hybrid channel decoder useful for multiplexing multiple virtual traffic lanes together and then demultiplexing them, each virtual traffic lane coded separately; and FIG. 19 is a block diagram for a packet switch fabric card that accepts the multiple virtual traffic lane signal produced by, e.g., the FIG. 17 hybrid channel coder, and allows switching of each virtual lane separately, or as a port pipe group.

DETAILED DESCRIPTION

The following disclosure describes embodiments of a channel coder, decoder, system, and method that can be used instead of an 8b/10b, 64b/66b, or similar coding scheme. These embodiments overcome the coding inefficiency of an 8b/10b system by using a scrambler, instead of an 8b/10b coder, to prepare digital data for transmission. In some preferred embodiments, however, 8b/10b unscrambled codewords are inserted between segments of the scrambled digital data, and used to align the receiver and help maintain proper channel timing and DC balance.

Unlike the simple two-bit toggled block type codes used in 64b/66b coding, the unscrambled codeword groups are long enough to be matched with a scrambler in preferred embodiments to provide similar average power spectral density, whether the channel is transmitting the unscrambled codewords or scrambled digital data. This provides a distinct advantage for high-speed electrical serdes (serializer/deserializer) operation, since these serdes units are generally highly sensitive to changes in received signal spectra and may produce more bit errors when the spectral density of a received signal shifts rapidly.

Figure 3:
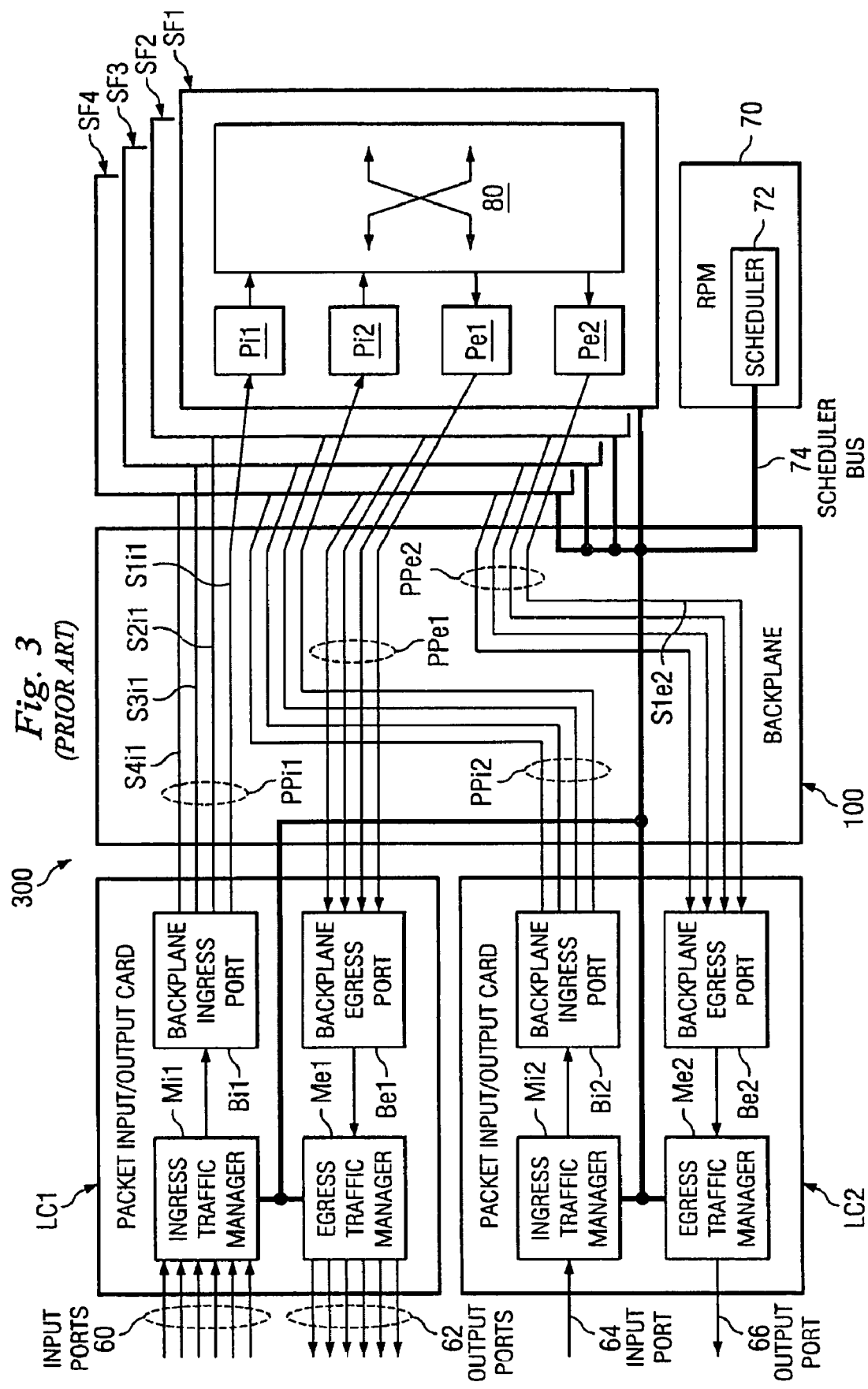
FIG. 3 contains an illustration of a prior art packet switch that can be adapted to operate according to an embodiment of the present invention.

In one application described herein, high-speed signals traversing an electrical backplane are coded using a hybrid channel coder according to an embodiment of the present invention. FIG. 3 illustrates a prior art packet switch 300, comprising an electrical backplane 100, where such a switch has now been adapted to use hybrid channel coding according to an embodiment of the present invention. This packet switch previously operated using 8b/10b coding for backplane 100, as will first be described.

Backplane 100 has slots with electrical connectors that accept packet input/output cards, also known as "line cards," an RPM (route processing module) card, and switch fabric cards. When such cards are connected to backplane 100, the backplane supplies signals, and preferably power, to each card. Although two line cards, four switch fabric cards, and one RPM card are shown in FIG. 3, some deployed systems accept up to 14 line cards, nine switch fabric cards, and two RPM cards (with the second providing redundancy should the first fail).

Line card LC1 is responsible for packets received at input ports 60 and transmitted from output ports 62, e.g., from/to other network devices. The ports themselves may be configured to accept different optical and/or electrical connectors and signaling formats. A packet processor (not shown) on LC1 determines an appropriate output line card and port for received packets, tags the packets with a tag header describing this internal switch destination, and forwards the packets to an ingress traffic manager (ITM) Mi1. Ingress traffic manager Mi1 stores the tagged packets in queues, each queue storing packets bound for a particular line card egress traffic manager (ETM). Queue occupancy information is transmitted across backplane 100 on scheduler bus 74, to a scheduler 72 on an RPM card 70.

Scheduler 72 receives similar queue occupancy information from other line card ITMs as well, e.g., an ITM Mi2 on a line card LC2. Scheduler 72 arbitrates between the line card ITMs based on some criteria, and arrives at an epoch-based schedule. As used herein, an epoch is a known switch time interval, during which the switch fabric cards will remain in a given switch fabric configuration. Typical selected epoch durations are sufficient for each ITM to transmit 10,000 to 100,000 bytes of stored packet data. Thus the epoch-based schedule grants permission, at each epoch, for some number of ITMs to transmit multiple queued packets to some number of ETMs. The epoch grants are transmitted by the scheduler to the ITMs using scheduler bus 74.

When ITM Mi1 has packets queued for a specific ETM, e.g., ETM Me2 on line card LC2, scheduler 72 will eventually grant ITM Mi1 an epoch in which to transmit the packets to ETM Me2. When ITM Mi1 receives such a grant, it retrieves tagged packets from one or more queues in which it holds packets bound for ETM Me2, and submits the packets as an epoch data frame to a backplane ingress port Bi1.

Backplane ingress port Bi1 splits the epoch data frame into strands S1$i$1, S2$i$1, S3$i$1, and S4$i$1, where the strands taken together form a "port pipe" PPi1 for transmitting epoch data from backplane ingress port Bi1 to the switch fabric. Each strand transmits a portion of the epoch data across backplane 100, e.g., on a differential trace pair, to a corresponding switch fabric port interface Pi1 on a corresponding switch fabric card SF1, SF2, SF3, or SF4.

Figure 4:
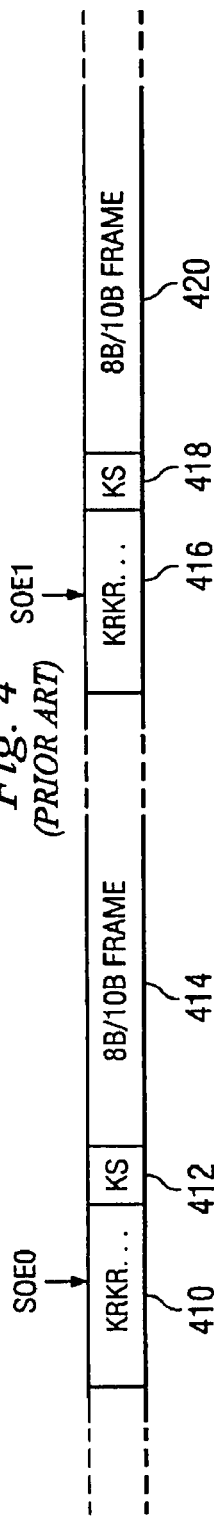
FIG. 4 illustrates the prior art 8b/10b backplane channel coding format for the packet switch of FIG. 3.

FIG. 4 contains a data sequence that illustrates the backplane ingress port Bi1 epoch data format for each strand, where "K," "R," and "S" are 8b/10b idle, reversed idle, and start control characters. At the end of each epoch, ingress port Bi1 transmits a repeating idle character sequence KRKR . . . on each strand, while ingress port Bi1 waits for the start of the next epoch. Thus ingress port Bi1 is transmitting the idle character sequence 410 on each strand when it receives a start of epoch signal SOE0. After receiving SOE0, port Bi1 transmits a predetermined number of additional KR character pairs, and then transmits a KS character pair 412, on each strand. The epoch data from each strand is coded with an 8b/10b coder, and transmitted after KS character pair 412 as 8b/10b frame 414. After 8b/10b frame 414 is transmitted, port Bi1 resumes transmitting idle characters (KR sequence 416) while awaiting the next start of epoch signal SOE1. Upon receiving signal SOE1, the KR sequence 416 is terminated as before, followed by a KS character pair 418, and a next 8b/10b frame 420. Note that 8b/10b frames 414 and 420 refer to different epoch grants, and will typically have different line card destinations.

Referring back to FIG. 3, the operation of switch fabric cards SF1 to SF4 will now be explained. Each switch fabric card SFn receives an ingress port pipe strand Snim from a backplane ingress port Bim, and transmits an egress port pipe strand Snem to a backplane egress port Bem. At the end of each epoch, while idle characters are being transmitted by each backplane ingress port, a switch matrix 80 on each switch fabric card is reconfigured for the next epoch. As each switch fabric card handles one strand from each port pipe, scheduler 72 transmits an identical epoch switch configuration to each switch fabric card, and each switch matrix is reconfigured identically.

One attractive feature of this design is that each backplane ingress and egress port pipe strand always uses the same transmitter and receiver. Accordingly, each link remains bit-synchronized by the idle character sequences generated by each transmitter while the switch matrix on each card reconfigures to connect different ingress port pipes to different egress port pipes. Because K and R have a comma property, the links also remain character-aligned during reconfiguration.

Switch fabric egress ports Pe1 and Pe2 on each switch fabric card operate similarly to backplane ingress port Bi1, except the 8b/10b epoch frame data is received, already 8b/10b formatted, from switch matrix 80. Referring to switch fabric egress port Pe2 and an egress port pipe PPe2, the switch fabric cards transmit an egress frame across backplane 100 to backplane egress port Be2. Backplane egress port Be2 detects the epoch start from the KRKRKS pattern, and then begins decoding eight-bit strand data from each ten-bit character strand. The decoded strand data is aligned and presented to egress traffic manager Me2 for eventual transmission on an output port 66.

In summary, each port pipe strand uses a relatively short inter-epoch control character sequence (e.g., FIG. 4 character sequence 410/412), with a relatively long epoch frame that represents 8b/10b channel-coded data. Thus a significant source of channel inefficiency is the 8b/10b channel coding of the epoch data itself. For an exemplary case where each port pipe strand supports signaling at 3.125 Gbps (billion bits per second), and ignoring the inter-epoch control character sequences, each ingress strand can only code and transmit data from its ITM at 2.5 Gbps. Were there a method to channel-code ITM data more efficiently, e.g., at 3.125 Gbps, backplane 100 and switch fabric 80 could transmit 25% more packet data each epoch than was previously possible.

Figure 5:
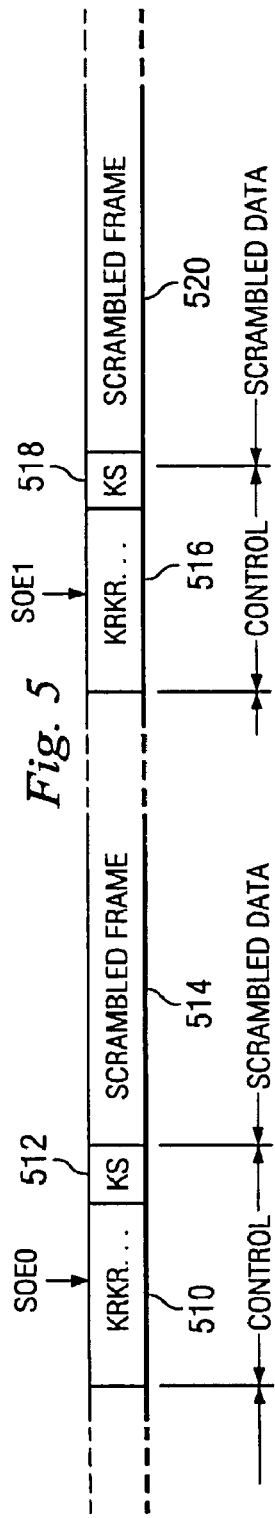
FIG. 5 illustrates a hybrid backplane channel coding format according to an embodiment of the present invention.

FIG. 5 contains a data sequence that illustrates a backplane ingress port Bi1 epoch data format for each strand, where backplane channel coding uses a hybrid transmission code according to an embodiment of the present invention. Like in FIG. 4, an inter-epoch 8b/10b idle character sequence 510 is transmitted on each strand. Once the start of epoch signal SOE0 is received, a predetermined number of additional KR idle character pairs are transmitted, followed by a KS character pair 512. Following the KS character pair, a scrambled data frame 514 is transmitted. After scrambled data frame 514 is transmitted, an inter-epoch 8b/10b idle character sequence 516 is transmitted on each strand. Idle character sequence 516 continues until start of epoch signal SOE1 is received, after which a predetermined number of additional KR idle character pairs are transmitted, followed by a KS character pair 518. Finally, a next scrambled data frame 520 is transmitted.

The scrambled frames 514 and 520 can achieve 100% coding efficiency, as a one-to-one correspondence can exist between input data bits and coded data bits. In the described electrical backplane utilizing high-speed differential signaling pairs, however, a variety of other considerations exist, many of which differ from conditions found on other links.

First, the high-speed differential receivers that receive each port pipe strand require a certain number of bit transitions per unit time to maintain phase lock with the transmitter. In the prior art 8b/10b coding scheme, extremely frequent transitions are guaranteed, no matter what data is presented to the coder. With a scrambler, however, it is possible that a given epoch data segment could produce an extended "run" of zeros or ones on the channel, causing the receiver to lose phase lock with the transmitter. Therefore, a preferred scrambler for this use would have an extremely low probability of generating runs long enough to cause significant timing error drift. Also, in the unlikely occurrence of such a run, an inter-epoch comma sequence such as the one provided in FIG. 5 is long enough and distinct enough to provide an opportunity for the receiver to quickly re-achieve timing lock and character alignment, such that only one epoch is lost in the improbable event that a "bad" scrambler sequence causes the receiver to lose lock.

Secondly, even when runs aren't long enough to defeat timing lock, high-frequency differential receivers can be extremely sensitive to shifts in the "eye pattern"—the characteristic time-voltage separation between differential signals plotted between successive bit transitions—for received data. Should the eye pattern shift substantially between a scrambled frame and the inter-epoch control sequence, this receiver sensitivity may cause a receiver to generate bit errors after a channel transition from control to scrambled data, or vice versa. Accordingly, it has now been discovered that in a hybrid coding scheme it is preferable to use a scrambler and a control character sequence that have similar power spectral densities. Generally, this can be achieved with a scrambler that has a similar distribution of run length probabilities as those occurring in the control character sequence.

As a third consideration, it has now been discovered that a scrambler that produces channel patterns with strong characteristic frequencies can disrupt the group delay for bit transitions traversing the backplane, again causing variations in the received eye pattern that can result in received bit errors. Furthermore, such patterns can increase electromagnetic interference (EMI), which is generally undesirable for a number of reasons. Accordingly, preferable scramblers present a scrambler output with a fairly continuous spectral content.

As a fourth consideration, particularly when the hybrid code is transmitted through an electrical backplane, it is preferable that the hybrid code be DC-balanced. DC balancing allows the transmitters and receivers to be AC-coupled to the backplane, e.g., using DC blocking capacitors. Such capacitors allow hot-swapping of cards, and may be required when the backplane distributes primary power to the cards. Generally, for a continuous scrambled transmission that could run to 75,000 bits or more, the scrambler itself should be closely DC-balanced in order to maintain DC balance on the hybrid coded channel.

Finally, as a practical consideration, it is preferable that the scrambler not require long registers.

Figure 6:
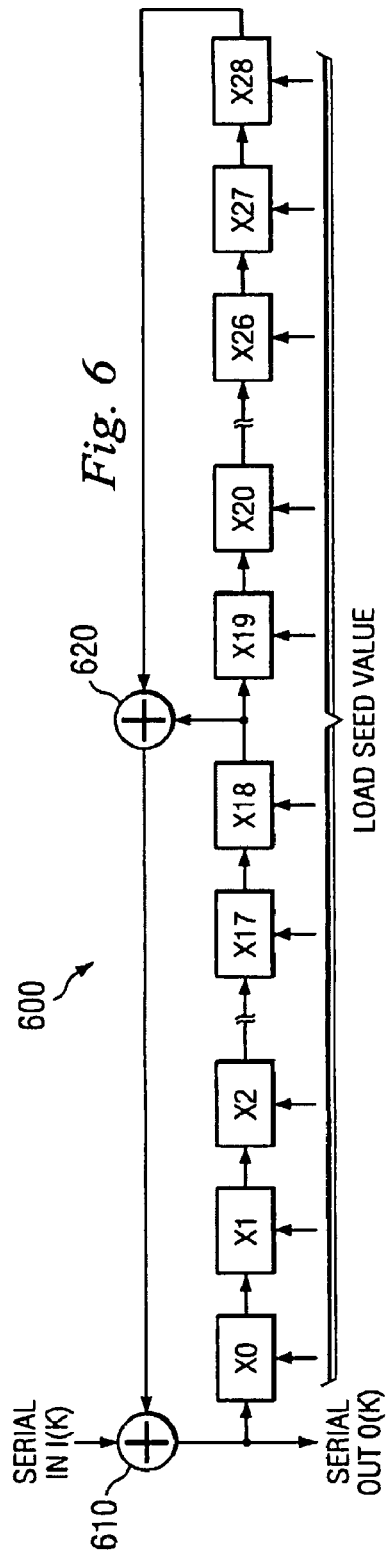
FIG. 6 contains a block diagram for a scrambler useful with embodiments of the present invention.

FIG. 6 illustrates a scrambler 600 that has been found to meet the considerations above in a hybrid coder that uses 8b/10b comma characters during the control portion of a hybrid channel coding sequence. Scrambler 600 is described in typical scrambler terminology as an x29+x19+1 scrambler, where xn represents the scrambler output delayed by n bits.

Conceptually, scrambler 600 comprises 29 bit-delay registers X0 to X28 chained together, and two bit XOR operators 610 and 620. Each delay register contains a parallel load input for initializing the scrambler with a seed value. Once the seed value is loaded, at each clock cycle k delay register Xn receives the value stored in register X(n−1) during clock cycle k−1. The value stored in registers X18 and X28 are XORed by XOR operator 620, and the output of XOR operator 620 and a serial input I(k) are XORed to produce a serial output O(k). The serial output O(k) is also stored in register X0 as X0(k). In other words, $$O(k)=I(k) \oplus O(k-19) \oplus O(k-29)$$

Scrambler 600 has been experimentally found to have a transition density of around 30%, good DC balance, a fairly smooth power spectral density, a run length distribution similar to that found in 8b/10b sequences, and a maximum run length that rarely exceeds 25 bits (and has a probability of less than $10^{-18}$ of reaching 58 bits). As an added advantage, since the output of scrambler 600 statistically approximates the power spectral density of 8b/10b code, it can be used with the inter-epoch control sequences used in prior art 8b/10b epoch coding, allowing hybrid-coded epoch data to be transmitted, if desired, through prior art switch fabric cards. Furthermore, the seed value for the scrambler can be set experimentally to provide a smooth run-length transition at the beginning of each epoch, for typical data appearing at the head of an epoch.

Some embodiments possess hardware capable of performing scrambler bitwise shifts and XOR operations at line rate. It is noted, however, that various hardware approaches exist for parallelizing the bit-serial computation of a scrambler. Such an approach can be used in embodiments of the present invention to scramble multiple bits of a parallel input stream at less than line rate, followed by serialization of a multiple bit scrambler output at line rate.

Figure 7:
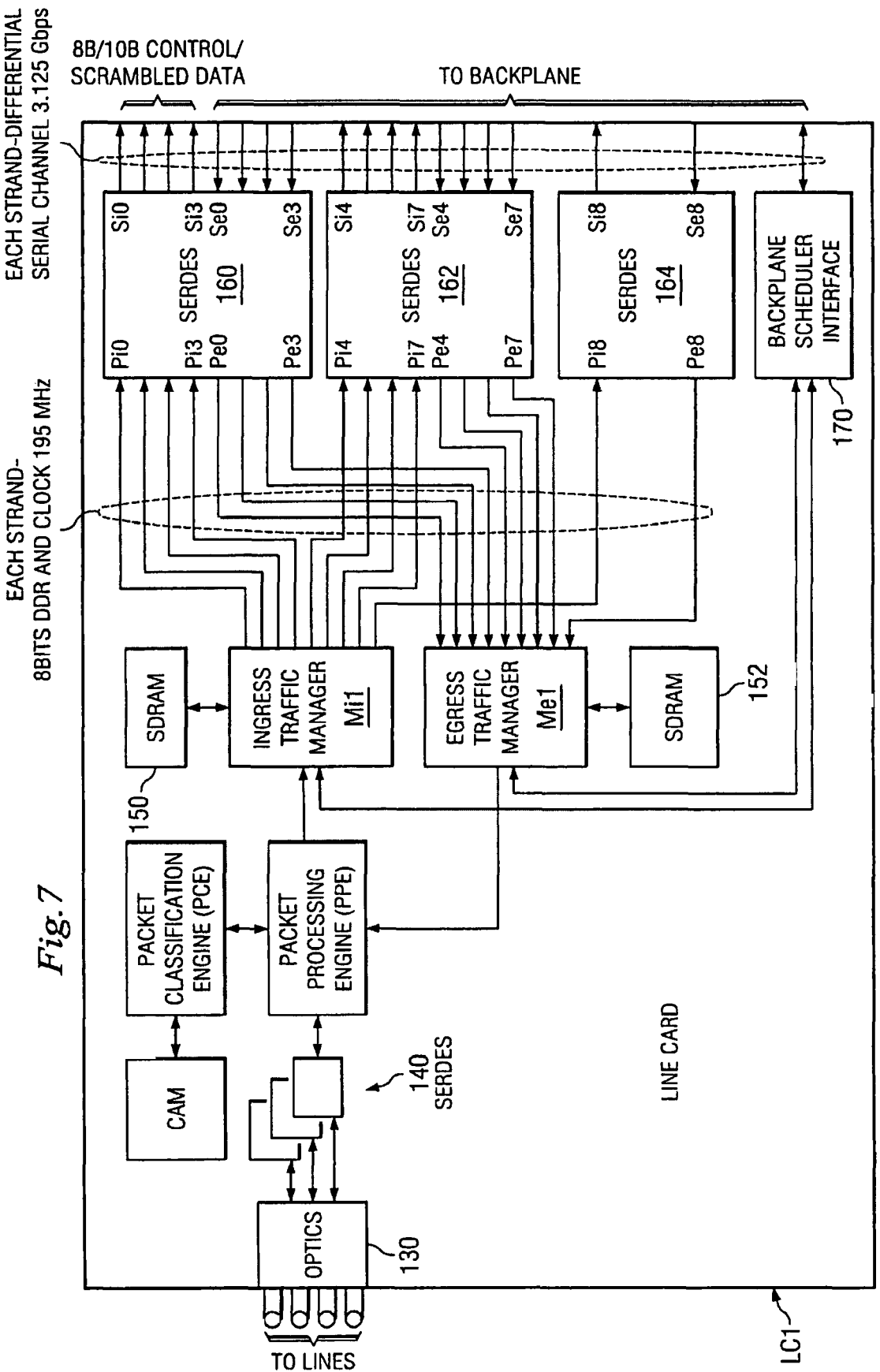
FIG. 7 is a block diagram for a packet switch line card that uses the hybrid backplane channel coding format of FIG. 5.

FIG. 7 presents further details for a line card LC1 useful with some embodiments of the present invention. An ingress traffic manager Mi1 and an egress traffic manager Me1 operate generally as those described in conjunction with FIG. 3. Each uses synchronous dynamic random access memory (SDRAM) to implement the previously-described packet queues—ITM Mi1 uses SDRAM 150 and ETM Me1 uses SDRAM 152. A backplane scheduler interface 170 communicates across the backplane with a scheduler, and interfaces with ITM Mi1 and ETM Me1.

Packets are received from and transmitted to remote packet network devices using optics 130 and accompanying serializer/deserializers (serdes) 140. Serdes 140 and a packet processing engine PPE exchange data on one or more parallel interfaces. Packet processing engine PPE processes ingress packets before forwarding them to ITM Mi1, and processes egress packets received from ETM Me1. A packet classification engine PCE and an attached CAM (content addressable memory) lookup information needed by packet processing engine PPE to direct ingress packets to the appropriate ITM queue.

In this example, nine switch fabric cards are used (eight active plus a backup), and thus nine switch fabric ingress strands Si0 to Si8 and nine switch fabric egress strands Se0 to Se8 are present. Three serdes 160, 162, and 164 handle serialization/deserialization for the strands, with serdes 160 handling ingress and egress strands 0-3, serdes 162 handling ingress and egress strands 4-7, and serdes 164 handling ingress and egress strands 8.

All strands are handled similarly. As an example, ITM Mi1 supplies parallel strand 0 data Pi0 to serdes 160 using eight bitlines and a clock, with the clock running up to 195 MHz and the data supplied at Double Data Rate (DDR, meaning new data is supplied on each negative and positive transition of the clock). Serdes 160 produces the inter-epoch 8b/10b control sequence, scrambles the epoch data strand Pi0, merges the two with appropriate timing, and serializes the hybrid data stream for transmission on a differential serial channel Si0 at 3.125 Gbps.

Serdes 160 handles the received serial strand Se0 in analogous fashion to create a parallel strand Pe0 for ETM Me1.

Figure 8:
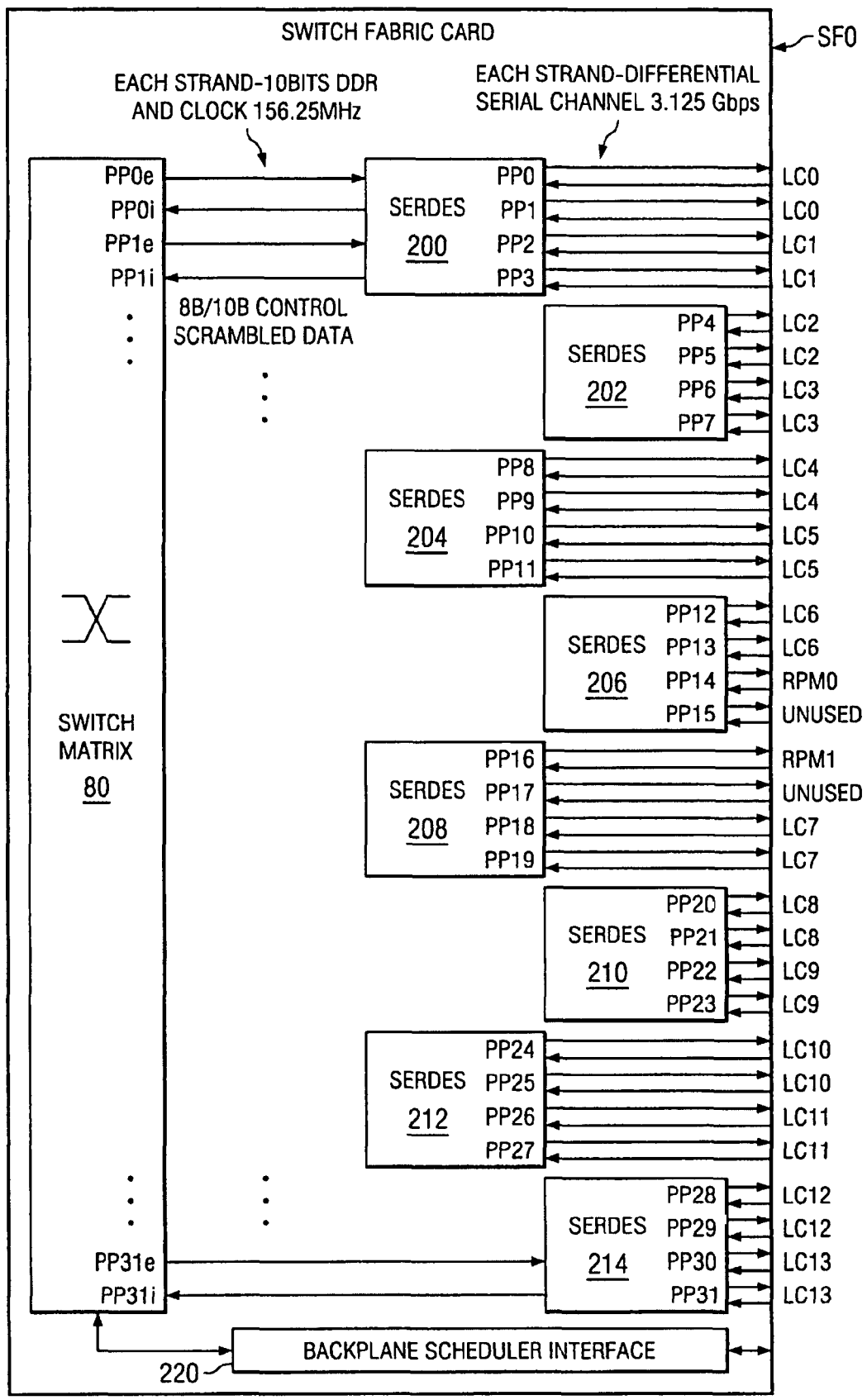
FIG. 8 is a block diagram for a packet switch fabric card that accepts the hybrid backplane channel coding format of FIG. 5.

FIG. 8 shows details for a switch fabric card SF0 capable of switching up to 32 ingress port pipe strands to up to 32 egress port pipe strands. Eight serdes 200 to 214 each accept four incoming port pipe strands and transmit four outgoing port pipe strands. The labels to the left of the serdes indicate one possible assignment of the port pipe strands among 14 line cards and two RPMs.

In one embodiment, each serdes is capable of detecting 8b/10b idle character sequences in each incoming port pipe strand, and aligning to those sequences. The serdes make no attempt to descramble or adjust bit alignment while scrambled data is transmitted. Instead, each strand is parallelized and submitted in a DDR format to switch matrix 80 on ten bit lines, with a corresponding 156.25 MHz clock for each strand. Switch matrix 80 acts as a crossbar to route the ingress port pipe strands to egress port pipe strands according to a switch configuration supplied by a scheduler through a backplane scheduler interface 220. The switched strand data is supplied by switch matrix 80 back to the serdes, each strand submitted in a DDR format on ten bit lines with a corresponding 156.25 MHz clock. As the egress strand data supplied to each serdes may switch sources between epochs, the serdes align the KR sequences for the last epoch and the current epoch during the inter-epoch gap. This alignment makes the transition from one sender to the next appear seamless at the egress port pipe strand receivers on the line cards. Throughout this entire switching process, the scrambled epoch data is handled as 10-bit characters, just as if it comprised 8b/10b channel-coded characters.

In the embodiment described above, line card serdes 160, 162, and 164 are responsible for generation and decoding of hybrid-coded epoch data. FIGS. 9 and 10 illustrate, respectively, a hybrid channel coder 900 and a hybrid channel decoder 1000 that can be implemented for each serdes strand.

Referring first to FIG. 9, hybrid channel coder 900 comprises a controller 910, a FIFO (First-In First Out data buffer) 920, a scrambler 600, a seed register 930, a 32:10 gearbox 940, an alignment sequence generator 950, a multiplexer 960, and a serdes transmitter 970. A start of epoch (SOE) signal is received by controller 910. Epoch data frames for strand i are received by FIFO 920 on eight DDR bit lines, according to a parallel clock PCLKi. Hybrid channel coder 900 composes a hybrid bitstream for strand i, which serdes transmitter 970 then transmits to the backplane on a differential pair P1, through two DC-blocking capacitors C.

Figure 11:
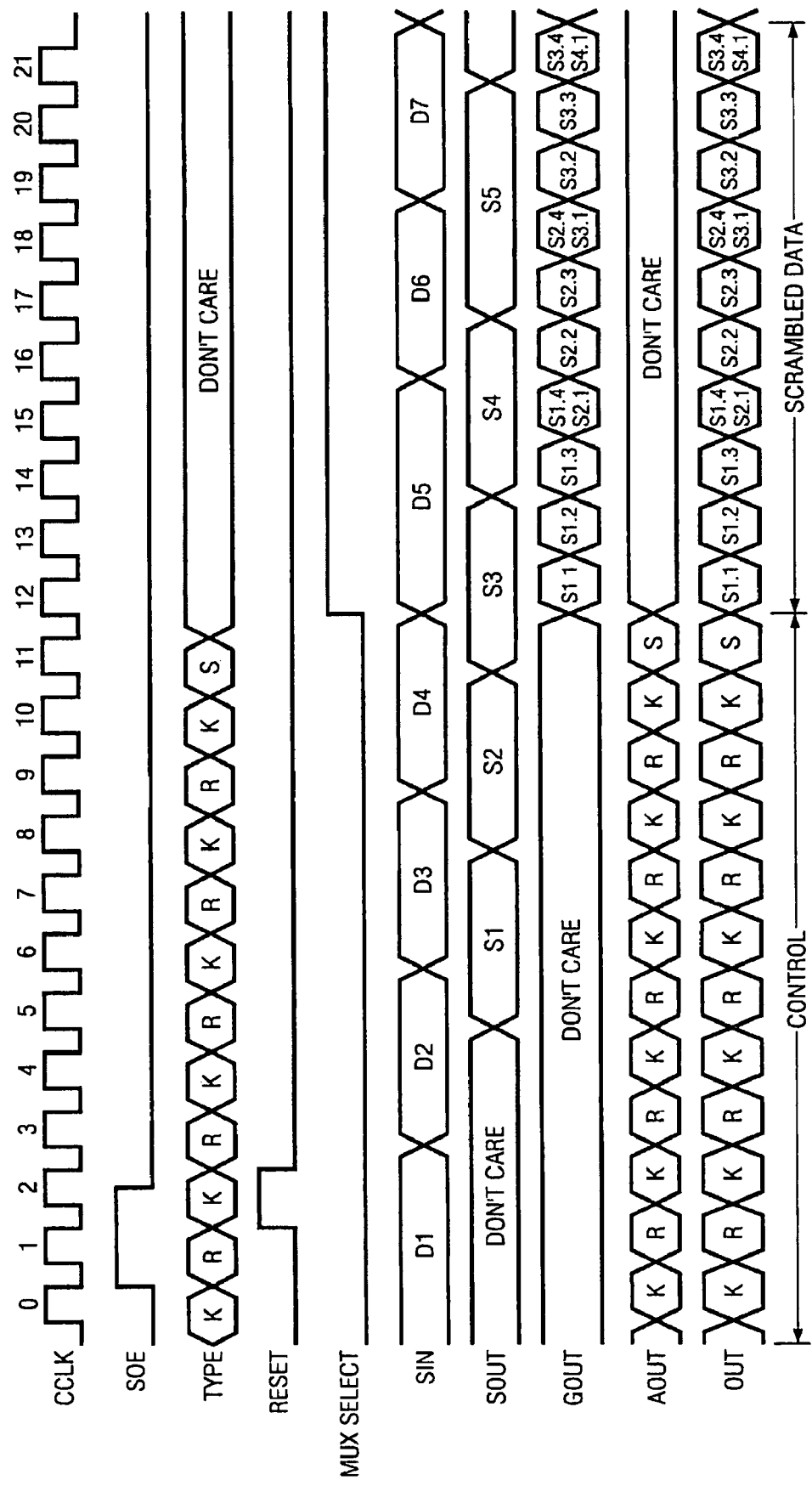
FIG. 11 shows a timing diagram for the hybrid channel coder of FIG. 9.

Further explanation of the internal operation of hybrid channel coder 900 will refer also to FIG. 11, which presents a timing diagram for channel coder operation at the start of a new epoch.

A clock CCLK has a clock rate equal to ⅒ the line rate of the serdes transmitter 970 output, e.g., a 312.5 MHz clock rate for 3.125 Gbps serial transmission. Twenty-two positive CCLK edges, 0-21, and corresponding negative clock edges, are illustrated in FIG. 11.

Controller 910 is responsible for placing 8b/10b control character sequences and scrambled epoch data on the coder output at appropriate times during each epoch. At CCLK 0 in FIG. 11, the switch is in an inter-epoch region where each serdes transmitter is expected to transmit a KR sequence. Controller 910 supplies a TYPE command to an alignment sequence generator 950: On the positive edge of CCLK 0, alignment sequence generator 950 reads a TYPE corresponding to an 8b/10b K idle character, and thus generates a 10-bit parallel K character output AOUT. At the same time, controller 910 has supplied a MUX select value of 0 to multiplexer 960, which configures multiplexer 960 to pass AOUT as OUT to serdes transmitter 970. On the negative edge of CCLK 0, serdes transmitter 970 reads the K character from OUT, serializes it, and subsequently transmits it over 10 bit times on differential pair P1.

The SOE signal is generated by another switch module (the RPM), and is therefore not synchronous with CCLK. Controller 910 may therefore receive the SOE signal at any time in a KR cycle. In FIG. 11, SOE is asserted just after the negative edge of CCLK 0. At this time, controller 910 has just issued a TYPE command for an 8b/10b R idle character. Controller 910 latches SOE on the positive edge of CCLK 1 and waits for the beginning of the next KR sequence pair to act on SOE. Meanwhile, the R idle character is transmitted in a similar manner to the previous K idle character.

On the falling edge of CCLK 1, controller 910 initiates its start-of-epoch control sequence. One aspect of this control sequence is to drive a predetermined number of additional KR character pairs on OUT, followed by a KS character pair where S is an 8b/10b start character. Accordingly, with the predetermined number of KR pairs set to four, controller 910 commands K character types for CCLKs 2, 4, 6, 8, and 10, R character types for CCLKs 3, 5, 7, and 9, and an S character type for CCLK 11.

While the start-of-epoch control characters are generated, controller 910 also initializes the scrambler and causes it to begin scrambling epoch data. On the negative edge of CCLK 1, controller 910 asserts a RESET signal to scrambler 600 and 32:10 gearbox 940. It is assumed that by this time an ITM has begun filling FIFO 920 with epoch data for the current epoch, represented as 32-bit FIFO data words D1, D2, etc. in FIG. 11. When scrambler 600 receives RESET on the rising edge of CCLK 2, it loads its delay registers with the value stored in seed register 930 and latches data word D1 from FIFO 920 on the falling edge of CCLK 2. Scrambler 600 processes D1 to produce a scrambled 32-bit word S1 on SOUT by the start of CCLK 5.

Gearbox 940 and scrambler 600 coordinate, e.g., by handshaking signals (not shown), the transfer of scrambled 32-bit words from scrambler 600 to gearbox 940. The scrambler is capable of generating a scrambled 32-bit word every three CCLK cycles or less, and the 32:10 gearbox consumes five scrambled 32-bit words every 16 clock cycles.

After the 8b/10b start character S has been transferred to serdes transmitter 970, controller 910 toggles MUX select (at the positive edge of CCLK 12) to switch OUT from AOUT to GOUT. MUX select can also be provided to the gearbox, or the gearbox can use internal timing to determine when to start placing scrambled data on GOUT. In FIG. 11, gearbox 940 places the first 10 bits of scrambled word S1, denoted as S1.1, on GOUT during CCLK 12. The second and third 10 bit segments, S1.2 and S1.3, follow during CCLKs 13 and 14. During CCLK 15, the final two bits of S1 (S1.4) and the first eight bits of S2 (S2.1) are transmitted.

At a switch fabric card, the hybrid bit sequence of FIG. 11 is received and switched to an egress serdes. The egress serdes, which will likely have been transmitting a KR sequence from another source at the time of switching, merges the new hybrid bit sequence at a KR boundary and transmits it to a companion serdes receiver on a line card.

FIG. 10 illustrates a hybrid channel decoder 1000 capable of receiving the switched bitstream of FIG. 11 from a switch fabric serdes. The switched bitstream is received on a differential pair P2, through two DC-blocking capacitors C, by a serdes receiver 1070. Serdes receiver 1070 recovers timing information from the received hybrid bitstream, and senses the inter-epoch KR sequences to produce a 10-bit, character-aligned input IN to an alignment sequence detector 1050 and a 10:32 gearbox 1040. Alignment sequence detector 1050 detects 8b/10b K, R, S, and possibly other characters in the incoming character stream, and indicates a corresponding TYPE to controller 1010 when such characters are recognized. When controller 1010 receives an SOE signal, it begins monitoring the TYPE sequence for at least the minimum number of KR repetitions, followed by KS. When KS is not received within a given timeframe after SOE, controller 1010 assumes that it is not receiving epoch data during the epoch and idles until the next epoch.

When the expected KRKS sequence is received, controller 1010 issues a reset to 10:32 gearbox 1040 and to a descrambler 600. Gearbox 1040 begins accumulating scrambling data, formats the data into 32-bit words, and forwards the words to descrambler 600. Descrambler 600 resets by loading its bit registers with the value stored in a seed register 1030, which must match the seed used by seed register 930 to compose the sequence. Descrambler 600 outputs descrambled data words to a FIFO 1020, which transmits strand data to an ETM.

Figure 12:
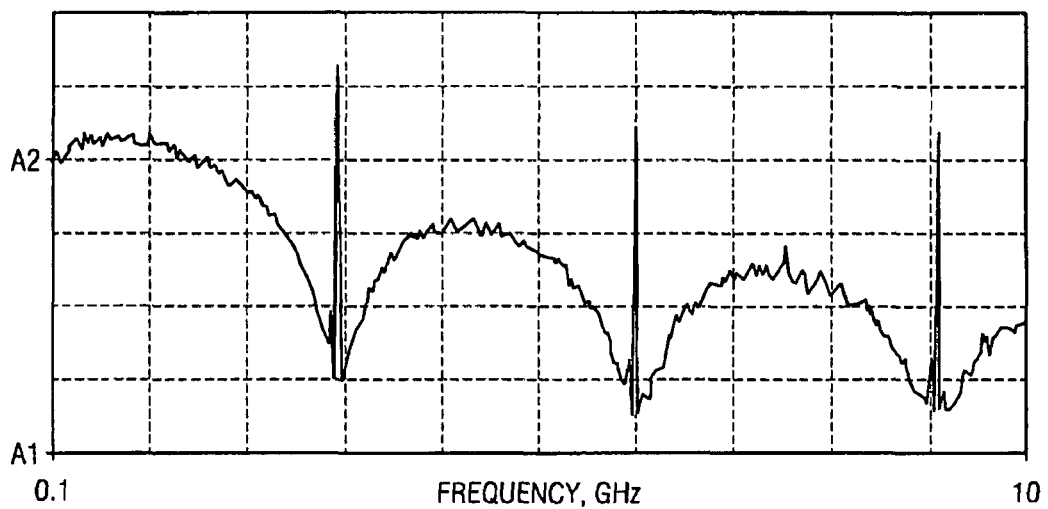
FIGS. 12-15 present measured frequency spectra for, respectively, channel coding using 8b/10b coding, an x29+x19+1 scrambler, an x7+x6+1 scrambler, and a 64b/66b coder.
Figure 13:
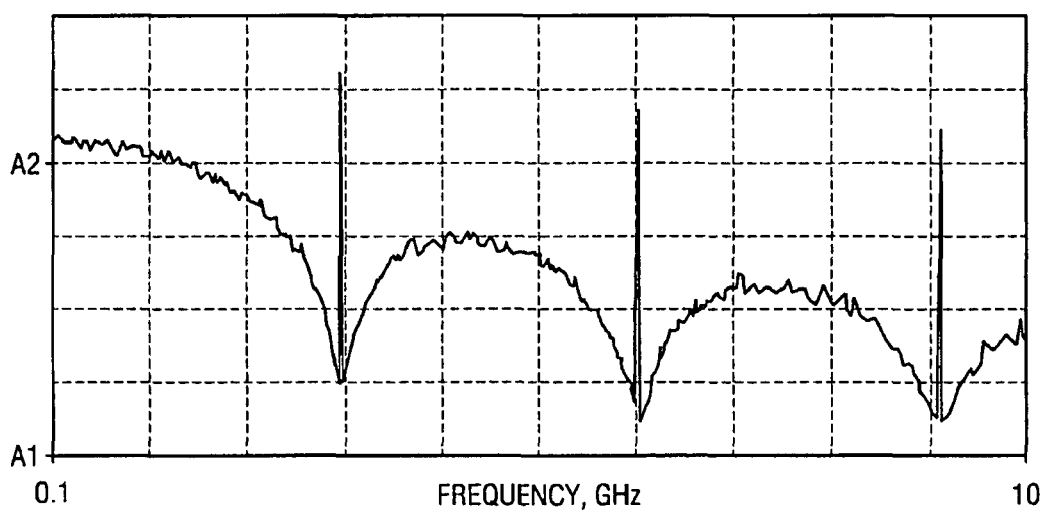

It has been determined that the hybrid coding scheme is generally more easily received, at least for data transmission using electrically conductive traces, when the scrambler power signal density closely resembles the control sequence power spectral density. FIGS. 12 and 13 illustrate power spectral density for a test data input sequence, channel coded, respectively, using an 8b/10b coder and the FIG. 6 scrambler. Although not exact, the two power spectral densities are close enough that a 3 GHz serdes is able to reliably receive a hybrid data stream, as described above, that switches between signals with the two power spectral densities.

Figure 14:
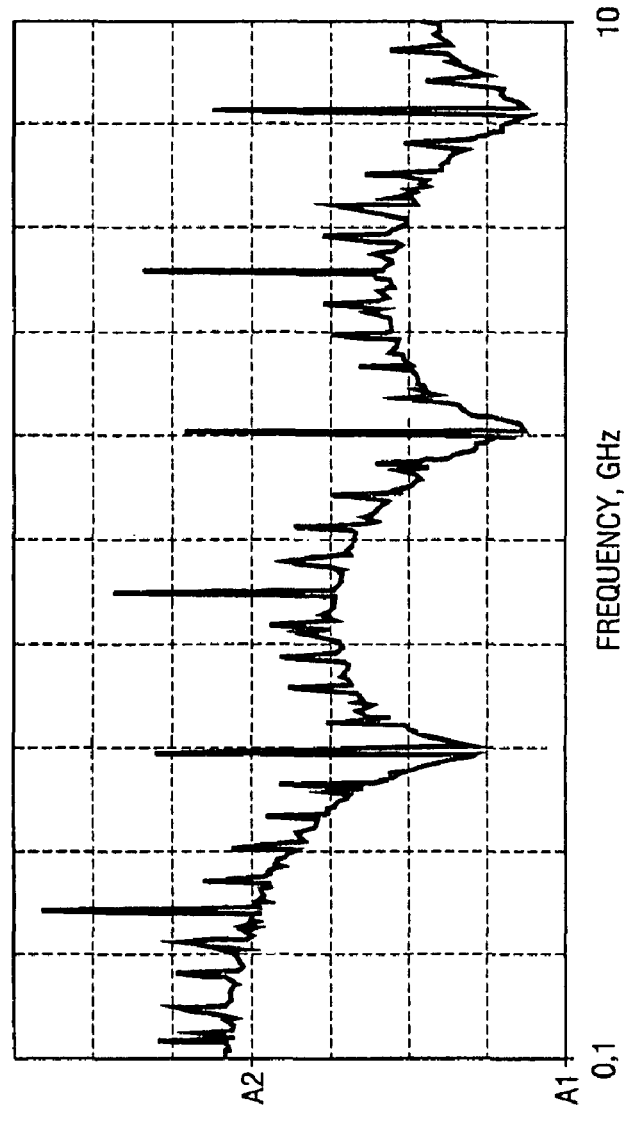

FIG. 14 illustrates the power spectral density for the test data input sequence coded using a scrambler of the form $x^7+x^6+1$. Several strong peaks exist within frequency areas that are generally smoothly varying with the $x^{29}+x^{19}+1$ scrambler, making the use of the FIG. 14 scrambling approach less appropriate for use with 8b/10b control characters. It is noted, however, that it may be possible to identify a different control sequence for use with the FIG. 14 scrambling approach in an alternate hybrid coding embodiment.

Figure 15:
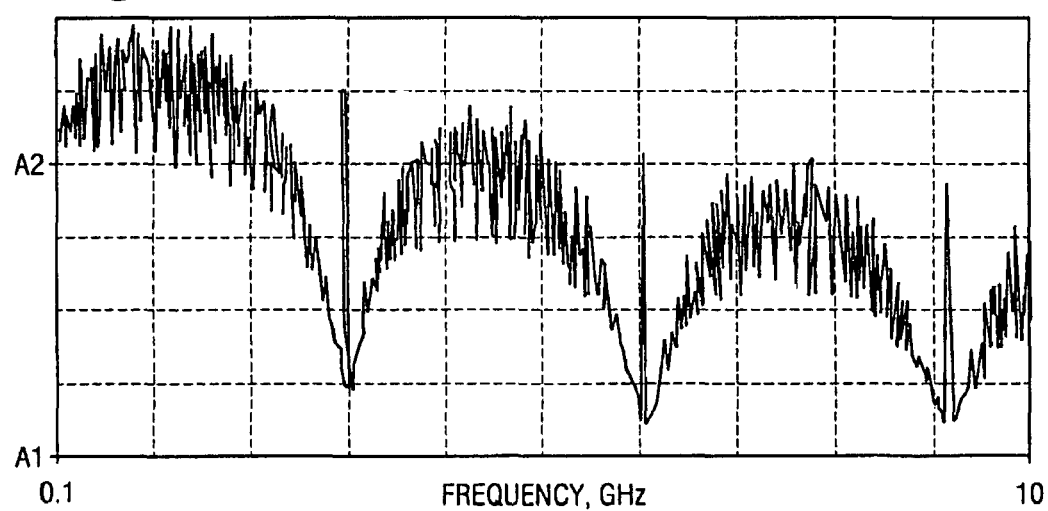

FIG. 15 illustrates the power spectral density for the test data input sequence coded using 64b/66b coding. It is noted that the overall shape differs significantly from 8b/10b power spectral density, and contains additional variability and periodicity that make 64b/66b coding less appropriate for use in a hybrid coding environment or generally for electrical data transmission. The 64b/66b code is also not DC balanced. It is also noted that the 64b/66b code itself is not a hybrid code within the meaning of the present invention, as the two bit block type code used to interpret each data/control block after descrambling is not a control character sequence. Even when 64b/66b blocks contain only control characters, the blocks are scrambled, which defeats the use of such a code directly as a hybrid code.

Many additional features can be used in an embodiment of the present invention. For instance, a hybrid coder can be designed to insert additional control characters within the scrambled data portion, either at fixed intervals or after a given number of bits without a bit transition. Such additional control characters can be selected to adjust any DC imbalances in the scrambled data. The inter-epoch control character sequences can also be varied to adjust for DC imbalances in a just-transmitted scrambled epoch. As previously mentioned, the number of control characters appearing between epochs can be varied, e.g., to adjust timing when switching between different scrambled data sources.

Figure 16:
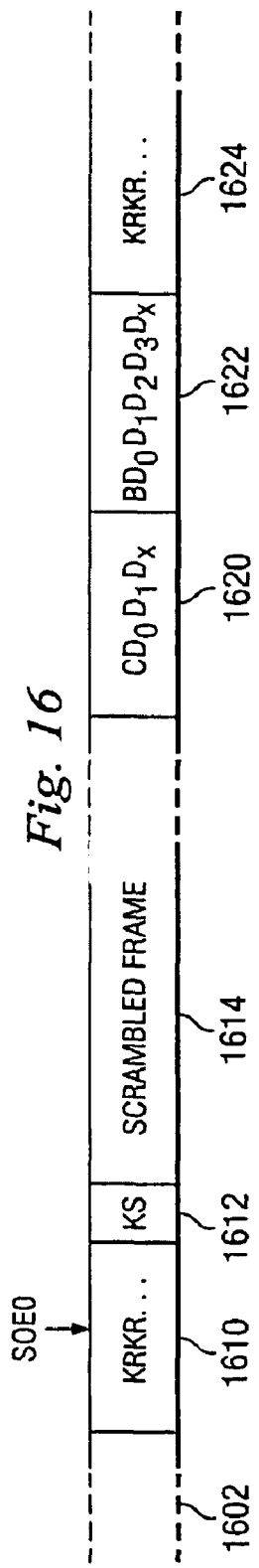
FIG. 16 illustrates a hybrid backplane channel coding format according to another embodiment of the present invention that allows unscrambled backchannel information to be transmitted after a scrambled data segment.

FIG. 16 illustrates epoch timing for an embodiment that uses optional post-amble coding after the scrambled frame. A preamble composed of a KR sequence 1610 and start sequence KS precedes a scrambled frame 1614, similar to that previously described. Following the scrambled frame 1614, a CRC (Cyclic Redundancy Check) record 1620 and/or a backchannel record 1622 can be optionally transmitted, followed by a KR sequence 1624 that leads into the next epoch preamble. The presence of the CRC record 1620 is indicated by a designated 8b/10b control character (labeled "C"). The C character is followed by three 8b/10b-encoded data words, which can include an error checking code calculated over the scrambled data frame and other information describing how the CRC for the frame should be processed. The presence of the backchannel record 1622 is indicated by a designated 8b/10b control character (labeled "D"). The D character is followed by a predetermined number of 8b/10b-encoded data words (shown here as five) that carry tuning data for the serdes transmit/receive pair. The transmit controller can insert one or both of these fields at the end of the scrambled data, and the receive controller detects their presence from the record designation characters.

The epoch length and control character length can be varied depending on application. In the packet switch example described, epoch lengths are generally set such that 30 to 80 thousand bits are serialized and transmitted during each epoch. Of these bits, roughly 600 (60 8b/10b control characters) are generally transmitted during the inter-epoch period. Other embodiments can, of course, use different values for epoch length and unscrambled control character length. It is believed that workable embodiments require at least 20 bits representing unscrambled control characters per epoch.

Above some channel rate, it may become impractical to operate a single hybrid channel coder. Other considerations with the ingress traffic managers may also warrant processing more than one strand of data. In situations such as these, multiplexed multilane hybrid scrambled transmission coding can be used to increase performance. An embodiment of such coding will now be described in conjunction with FIGS. 17 and 18.

Figure 17:
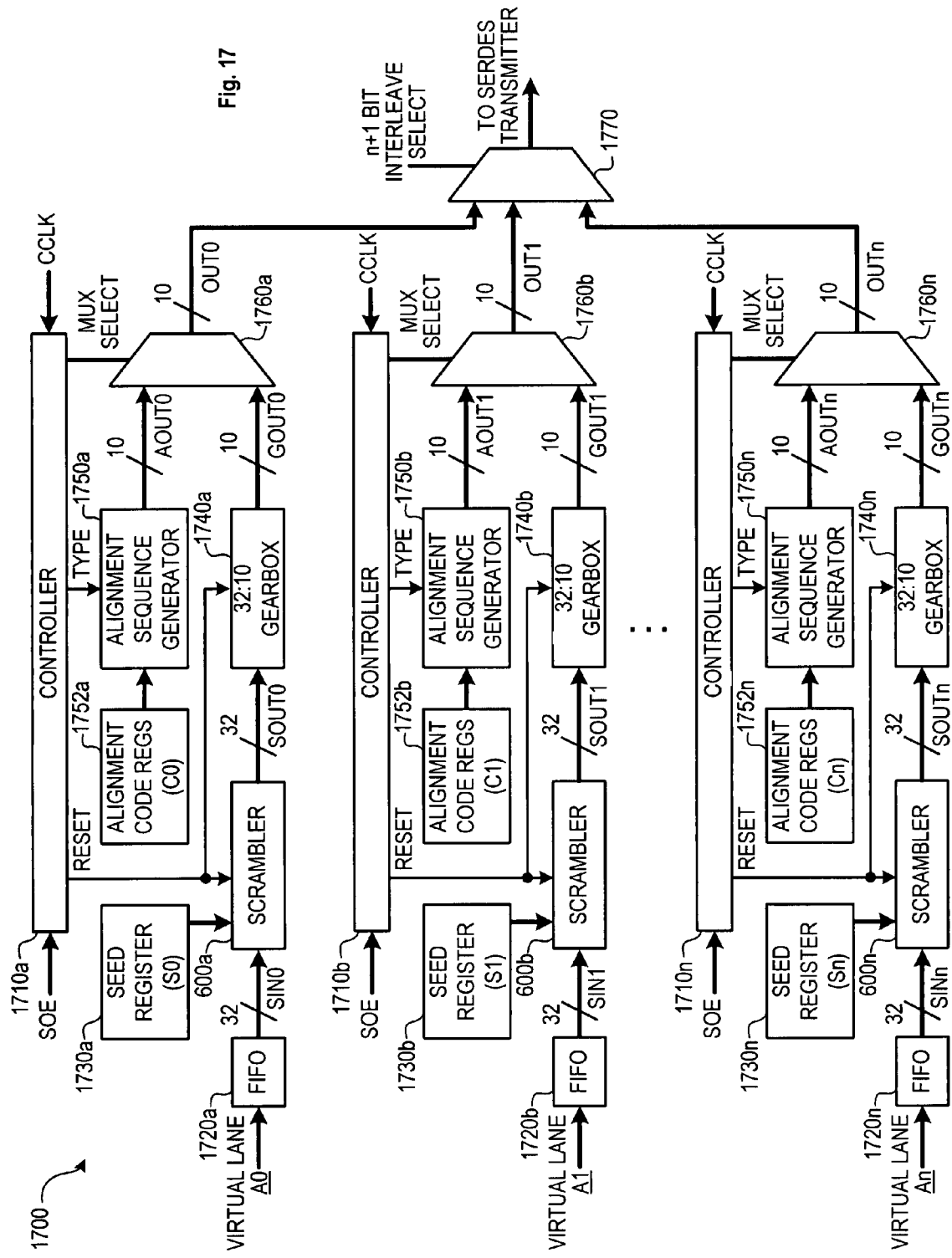

FIG. 17 contains a block diagram for a multiplexed multilane hybrid channel coder 1700, comprising n+1 individual hybrid channel coders and a bit interleave multiplexer 1770. Each individual hybrid channel coder comprises a controller (1710*a*, 1710*b*, ... 1710*n*), a FIFO (1720*a*, 1720*b*, ... 1720*n*), a seed register (1730*a*, 1730*b*, ... 1730*n*), a scrambler (600*a*, 600*b*, ... 600*c*), a 32:10 gearbox (1740*a*, 1740*b*, ... 1740*n*), an alignment sequence generator (1750*a*, 1750*b*, ... 1750*n*), a set of alignment code registers (1752*a*, 1752*b*, ... 1752*n*), and a multiplexer (1760*a*, 1760*b*, ... 1760*n*). Each block of each individual hybrid channel coder functions as described for the corresponding block of FIG. 9, with the exception of the alignment sequence generators, which will be described below. At the output of the individual hybrid channel coders (OUT0, OUT1, ... OUTn), the bit interleave multiplexer 1770 operates to interleave the individual outputs. In other words, the SERDES transmitter (not shown) will receive one bit from OUT0, followed by one bit from OUT1, etc. In one embodiment using only OUT0 and OUT1, a 20-bit wide data lane at the output of bit interleave multiplexer 1770 supplies 20-bit words to the SERDES transmitter, each word consisting of one 10-bit word from OUT0 and one 10-bit word from OUT1, bit interleaved with each other.

Instead of a single strand i as received by hybrid channel coder 900, hybrid channel coder 1700 receives data on multiple "virtual lanes" A0, A1, ... An. Each virtual lane may have the same speed and data width as the single strand i of FIG. 9, or some other appropriate width and speed. Each virtual lane may itself be a strand of a larger port pipe, or each virtual lane may be a strand of a virtual port pipe, such that the physical port pipe contains multiple virtual port pipes. Without respect to this architectural consideration, each virtual lane supplies data to a corresponding FIFO for transmission during an epoch.

Each alignment sequence generator (1750*a*, 1750*b*, ... 1750*n*) is paired with a corresponding set of alignment code registers (1752*a*, 1752*b*, ... 1752*n*), allowing the alignment codes to be tailored for each alignment sequence generator. When a controller supplies a TYPE command to one of the alignment sequence generators of FIG. 17, the alignment sequence generator uses the code stored for that TYPE command in the alignment code registers.

It now has been discovered that if the same or similar alignment codes are supplied on each virtual lane, correlation between the codes can cause undesirable drift in the phase locked loop(s) used to recover clock timing at the receiving end of the serial channel (in some cases, the data rate will appear to be 1/(n+1) the actual data rate during idle character transmission, as will be apparent after the following description). To avoid this happenstance, different alignment codes can be selected for neighboring lanes to ensure bit transitions with the appropriate spectra. For instance, the KR comma characters have an inverse comma formulation. With the forward and inverse formulations denoted as KR+ and KR−, respectively, the alignment code registers for a two-lane coder can be programmed to transmit KR+ on lane A0 and KR− on lane A1. When the bit interleave multiplexer 1770 interleaves the bits from the individual lanes, this results in a bit from K+ followed by a bit from K−, which will be the inverse of the first bit since the lanes are all synchronized, and the same for bits of R+ and R− transmitted sequentially as well, guaranteeing sufficient bit transitions. When more than two lanes are used, more than one pairing of forward, inverse comma sequences can be selected. If at least one pair of neighboring lanes are programmed with a unique pairing of forward, inverse comma sequences, that pair can be used to align the entire multiplexed sequence appropriately.

It also now has been discovered that it is preferable to use different seeds (S0, S1, . . . Sn) respectively for the scramblers associated respectively with the different virtual lanes. The seeds can be selected to reduce the likelihood that similar inputs on each lane will produce a correlation between OUT0 and OUT1 or some other group of two or more neighboring lanes when the lanes begin to transmit scrambled data, which once again could negatively impact clock recovery at the receiver. With two lanes and the x29 scrambler described previously, one pair of suitable seeds is S0=01010101010101010101010101010 and S1=00010001000100010001000100010.

FIG. 18 contains a block diagram for a multiplexed multi-lane hybrid channel decoder 1800, comprising n+1 individual hybrid channel decoders, a bit interleave demultiplexer 1870, and a pattern alignment detector 1880. Each individual hybrid channel decoder comprises a controller (1810a, 1810b, . . . 1810n), a FIFO (1820a, 1820b, . . . 1820n), a seed register (1830a, 1830b, . . . 1830n), a descrambler (600a, 600b, . . . 600c), a 10:32 gearbox (1840a, 1840b, . . . 1840n), an alignment sequence detector (1850a, 1850b, . . . 1850n), and a set of alignment code registers (1852a, 1852b, . . . 1852n). Each block of each individual hybrid channel decoder functions as described for the corresponding block of FIG. 10, with the exception of the alignment sequence detectors, which will be described below. At the input of the individual hybrid channel decoders (IN0, IN1, . . . INn), the bit interleave demultiplexer 1870 operates to de-interleave the individual inputs that were interleaved by the bit interleave multiplexer 1770 of FIG. 17. In one embodiment using only OUT0 and OUT1, the SERDES receiver (not shown) will transmit a 20-bit wide data lane to the input of bit interleave demultiplexer 1870, which will then de-interleave the bits of the 20-bit word to produce one 10-bit word for IN0 and another 10-bit word for IN1.

In order to correctly de-interleave the data from the SERDES, the starting bit of a word from at least one of the data lanes must be correctly identified. The starting bit of a word for virtual lane A0 will likely not be the starting bit of the word supplied from the SERDES. Detection of the proper alignment is provided by the pattern alignment detector 1880. Pattern alignment detector 1880 calculates from the contents of the alignment code registers (1852a, 1852b, . . . 1852n), or is supplied, a bit-multiplexed sync pattern that correspond to the alignment codes A0, A1, . . . An of the individual lanes after multiplexing by the bit interleave multiplexer 1770 of FIG. 17. Pattern alignment detector 1880 looks for this pattern (or a sufficient portion thereof) in the incoming multiplexed data. When the pattern is found and verified, detector 1880 provides the appropriate adjustment to demultiplexer 1870 such that the correct bits are supplied to each virtual lane.

The alignment code registers and seed registers of decoder 1800 are provisioned identically to the alignment code registers and seed registers of the same virtual lanes in coder 1700. Accordingly, each virtual lane is correctly sensed and descrambled, as described in conjunction with FIG. 10.

The embodiment described in FIGS. 17 and 18 is adaptable to other coding schemes, e.g., a variation of 64b/66b coding. Each hybrid coder is replaced with a 64b/66b coder, with each such coder using an appropriate seed, as described above. The 64b/66b scramblers and descramblers are reset whenever an alignment block is received on that virtual lane. Alignment blocks can be transmitted at the start of an epoch, or merely periodically in a non-epoch-based transmission system.

The alignment words are 66 bits long, and thus alignment words for neighboring lanes should be selected to differ in a significant number of bits to avoid negatively effecting clock recovery. In a two-lane system, for instance, lane zero can use an alignment word containing KR+KR+KR+KR+, and lane one can use an alignment word containing KR−KR−KR−KR−, where K and R are eight-bit comma characters.

Other variations on the virtual lane embodiments are possible. For instance, the controllers for the individual lanes can be replaced with a combination controller that operates all lanes in parallel. Embodiments also can use different scrambler polynomials in different lanes, e.g., an $x^{29}$ scrambler polynomial in some lanes and a 64b/66b scrambler in other lanes.

In one embodiment, switch fabric cards similar to switch fabric card SF0 of FIG. 8 can be used with the multiple lane scrambler/descramblers of FIGS. 17 and 18. The clock rate and/or data width of the signaling paths between the serdes and the switch core are adjusted for the data rate of the multiplexed scrambled signal, which is passed through the switch core without demultiplexing.

FIG. 19 shows a block diagram for another embodiment of a switch fabric 1900 useful with the multiple lane scrambler/descramblers of FIGS. 17 and 18. In this embodiment, switch fabric 1900 has the capability to demultiplex the scrambled virtual lanes appearing on a port pipe prior to switching through a switch matrix 1910. Taking a port pipe PP0 as exemplary, a serdes 194-0 receives an ingress signal from PP0 and supplies an egress signal to PP0. The PP0 ingress signal is detected and supplied to a demux receiver 192-0, which comprises a demultiplexer 1942 and a pattern alignment detector 1944, which function similar to demultiplexer 1870 and pattern alignment detector 1880 shown in FIG. 18. The PP0 egress signal is generated from a mux transmitter 193-0, which comprises a mux select signal generator 1946, FIFO buffers 1948.0 to 1948.n, and a multiplexer 1950. The function of demux receiver 192-0 and mux transmitter 193-0 will now be described in turn.

Demux receiver 192-0 receives a multiplexed scrambled signal from serdes 194-0. The pattern alignment detector 1944 looks for the sync pattern comprising the multiplexed sync patterns for the virtual lanes present in the signal. Pattern alignment detector 1944 uses the sync pattern alignment to drive demultiplexer 1942 to output each scrambled virtual lane separately, e.g., as scrambled ingress virtual lanes PP0i.0 to PP0i.n.

Switch matrix 1910 thus receives each of the demultiplexed scrambled ingress virtual lanes from port pipe PP0.

Switch matrix 1910 also receives demultiplexed scrambled ingress virtual lanes from port pipes PP1 to PPm, respectively, from demux receivers 192-1 to 192-m. Switch matrix 1910 switches the scrambled ingress virtual lanes to scrambled egress virtual lanes according to a scheduled switch configuration. The switch configuration may switch all of the virtual ingress lanes from a port pipe to the corresponding virtual egress lanes from a port pipe. Alternately, the virtual ingress lanes from a port pipe may be switched separately, with one or more switched to a corresponding virtual egress lane on a port pipe different from the switched egress port pipe of the other virtual ingress lanes of the port pipe. As long as all port pipes use a consistent alignment sequence and scrambler seed for a virtual lane assignment, separate switching of the lanes poses no problem at the eventual receiver of the multiplexed scrambled signal.

Switch matrix 1910 provides a set of scrambled egress virtual lanes to each of mux transmitters 193-0 to 193-m, corresponding respectively to the egress signals to be transmitted over each port pipe. Taking port pipe PP0 as exemplary, switch matrix 1910 provides scrambled egress virtual lanes PP0e.0 to PP0e.n, along with a mux clock signal that aligns the lanes, to mux transmitter 193-0. The scrambled egress virtual lanes PP0e.0 to PP0e.n are received, respectively, by FIFOs 1948.0 to 1948.n, and the mux clock signal is received by mux select signal generator 1946. The mux select signal generator 1946 generates multiplex select signals to multiplexer 1950, and advances the FIFOs appropriately, to re-multiplex the scrambled egress virtual lanes in the order expected by the eventual receiver.

Although specific signaling formats and speeds have been used in exemplary embodiments, the concepts described herein can be applied to other situations. Hybrid coding using 8b/10b control coding and an x29+x19+1 scrambler has been used in other embodiments at signaling speeds up to 12.5 Gbps. 8b/10b control coding has some attractive features, but its use herein does not preclude a hybrid coding scheme using other control character sequences or coding schemes, including characters that have no "comma" property considered separately and characters that may not be considered control characters in other applications. Although conventional two-level differential/NRZ (non-return to zero) serial signaling has been described, other serial signaling approaches, such as PAM4 (Pulse Amplitude Modulation-4 level) NRZ, or optical signaling methods, could be used with an embodiment of the present invention. The scrambler can operate in the serial data stream portion of a serdes, with an appropriate serial bypass path for unscrambled control characters.

The described switch fabric cards pass scrambled data through without descrambling that data. In other embodiments intermediate serdes on a link could descramble incoming data and re-scramble it. In such a case, different seeds could be used on each half-link, and/or the seed on each half-link would not need to be reloaded each epoch.

One of ordinary skill in the art will recognize that the concepts taught herein can be tailored to a particular application in many other advantageous ways. For instance, although a specific implementation example shows usage of hybrid coding across a backplane, such codes could also be employed on a link that connects two network platforms. The particular functional block descriptions and data widths described herein apply to some embodiments, and could be advantageously modified for use in different systems.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of transmitting digital data sequences from a sender to a receiver across a serial channel, wherein the receiver recovers the timing of the digital data sequences from the transmitted digital data sequences, the method comprising:
   scrambling a plurality of n digital data sequences, n>1, to generate a plurality of n scrambled digital data sequences, at least a first one of the digital data sequences scrambled using a first scrambler seed value and at least a second one of the digital data sequences scrambled using a second scrambler seed value different from the first scrambler seed value;
   bit-interleaving the plurality of scrambled digital data sequences to form an interleaved scrambled digital data sequence;
   transmitting a plurality of n alignment sub-sequences across a serial channel with the same bit-interleaving as the scrambled digital data sequences, each alignment sub-sequence corresponding to one of the digital data sequences and each alignment sub-sequence containing information indicating an interleave alignment on the serial channel; and
   subsequently transmitting the interleaved scrambled digital data sequence across the serial channel according to the interleave alignment indicated by the alignment sequence.

2. The method of claim 1, wherein scrambling the plurality of digital data sequences comprises resetting scrambling for each digital data sequence such that each scrambled digital data sequence begins from a scrambler reset condition following the transmission of the alignment sequence.

3. The method of claim 2, further comprising indicating a transition from the alignment sequence to the interleaved scrambled digital data sequences by transmitting at least one start symbol on the serial channel.

4. The method of claim 1, wherein the alignment sequence is transmitted periodically on the serial channel.

5. The method of claim 1, wherein the alignment sub-sequences, when interleaved, form an alignment sequence having data transitions with an average power spectral density approximately equal to the average power spectral density of the scrambled, interleaved digital data sequences.

6. The method of claim 1, wherein at least first and second ones of the alignment sub-sequences that are adjacent in the bit-interleaving pattern comprise alignment characters in the first sub-sequence, and the inverse of the alignment characters in the second sub-sequence.

7. The method of claim 1, wherein the alignment sequence containing information indicating an interleave alignment on the serial channel comprises at least one of the alignment sub-sequences containing information different from the other alignment sub-sequences.

8. The method of claim 1, further comprising receiving data transmitted across the serial channel, and detecting the interleave alignment of the data by matching the bit pattern formed by at least a portion of the interleaved alignment sub-sequences.

9. The method of claim 8, wherein each digital data sequence is limited to less than a number of bits that can be transmitted in an epoch of a determined length, each epoch delineated on the serial channel from other epochs by transmission of the alignment sequence.

10. The method of claim 9, wherein when a given one of the scrambled digital data sequences contains less than the number of bits that can be transmitted in an epoch of a determined length, the method further comprising interleaving repetitions of the alignment subsequence corresponding to that given digital data sequence with the other scrambled digital data sequences after all bits of the scrambled digital data sequence have been transmitted.

11. The method of claim 1, wherein the scrambling performed on each digital data sequence implements an $x^{29}+x^{19}+1$ scrambler.

12. The method of claim 1, wherein the scrambling performed on each digital data sequence implements a 64b/66b scrambler.

13. The method of claim 1, wherein the scrambling performed on at least one of the plurality of n digital data sequences implements a different scrambling polynomial than that implemented on at least one other of the plurality of n digital data sequences.

14. The method of claim 1, applied to a plurality of senders simultaneously communicating a plurality of interleaved scrambled digital data sequences across a plurality of serial channels to a plurality of receivers, the method further comprising switching the plurality of interleaved scrambled digital data sequences between sender and receiver, such that a different pairing of senders and receivers exists for two sequential interleaved scrambled data sequences transmitted by the same sender.

15. The method of claim 14, wherein the same alignment sequence is used by each sender.

16. The method of claim 14, wherein the corresponding digital data sequences from each sender are each scrambled using the same scrambler seed value.

17. The method of claim 16, the method further comprising, during switching of the plurality of interleaved scrambled digital data sequences between sender and receiver comprises de-interleaving each of the interleaved scrambled digital data sequences prior to switching, and re-interleaving each of the scrambled digital data sequences after switching and prior to forwarding to the respective receivers.

18. The method of claim 17, wherein switching comprises splitting a group of de-interleaved scrambled digital data sequences received from a common sender, and re-interleaving at least part of the group with de-interleaved scrambled digital data sequences from at least one other sender.

19. A distributed packet switch comprising:
an electrical backplane comprising a plurality of differential signal trace pairs;
a plurality of line cards each one of which comprises scramblers for scrambling the respective first and second digital data sequences and an interleaver to interleave the respective first and second digital data sequences; and
at least one switch fabric card coupled to the electrical backplane, the at least one switch fabric card comprising a crossbar switch that repeats the scrambled versions of the digital data sequences received from the line cards, during each epoch, on the differential signal trace pairs back to the line cards according to a crossbar configuration for that epoch, and each line card coupled to the at least one switch fabric card by at least two of the differential signal trace pairs, each of the differential signal trace pairs used for unidirectional communication either from a line card to a switch fabric card or from a switch fabric card to a line card;
wherein the line cards and switch fabric cards communicate interleaved scrambled digital data sequences across the differential signal trace pairs in a series of epochs, each epoch delineated by an alignment sub-sequence corresponding to one of the interleaved digital data sequences, the alignment sub-sequences following the same interleave pattern as the scrambled digital data sequences, and each interleaved scrambled digital data sequence comprising at least a first digital data sequence scrambled using a first scrambler seed value and a second digital data sequence scrambled using a second scrambler seed value.

20. The distributed packet switch of claim 19, wherein the switch fabric card comprises:
a plurality of de-interleavers, corresponding respectively to each differential signal trace pair on which the switch fabric card receives an interleaved scrambled digital data sequence from a line card, each de-interleaver separating an interleaved scrambled digital data sequence into a corresponding plurality of scrambled digital data sequences for switching through the crossbar switch; and
a plurality of interleavers, corresponding respectively to each differential signal trace pair on which the switch fabric card transmits an interleaved scrambled digital data sequence to a line card, each interleaver interleaving scrambled digital data sequences switched through the crossbar switch.

21. The distributed packet switch of claim 20, wherein the crossbar switch repeats a plurality of scrambled digital data sequences received from one of the de-interleavers to one of the interleavers according to the crossbar configuration.

22. The distributed packet switch of claim 20, wherein the crossbar switch repeats the plurality of scrambled digital data sequences received from one of the de-interleavers to a plurality of the interleavers according to the crossbar configuration.

23. The distributed packet switch of claim 22, wherein the crossbar switch switches at least one of the plurality of scrambled digital data sequences received from the one of the de-interleavers to an interleaver that receives at least one scrambled digital data sequence switched from another one of the de-interleavers.

24. The distributed packet switch of claim 20, wherein each of the plurality of scrambled digital data sequences appearing in an interleaved scrambled digital data sequence is assigned a lane, and wherein the crossbar configuration allows the crossbar switch to switch each lane differently from the other lanes.

25. The distributed packet switch of claim 19, wherein the scramblers implement $x^{29}+x^{19}+1$ scrambling.

26. The distributed packet switch of claim 19, wherein the scramblers implement 64b/66b scrambling.

27. The distributed packet switch of claim 19, wherein the line cards use two different scrambling polynomials to scramble the respective first and second digital data sequences.

28. The distributed packet switch of claim 19, wherein at least first and second ones of the alignment sub-sequences that are adjacent in the interleave pattern comprise alignment characters in the first sub-sequence, and the inverse of the alignment characters in the second sub-sequence.

29. The distributed packet switch of claim 19, wherein the alignment sequence containing information indicating an interleave alignment comprises at least one of the alignment sub-sequences containing information different from the other alignment sub-sequences.

30. A multi-channel coder comprising:

a plurality of scramblers, each scrambling a digital data sequence on a corresponding one of a plurality of virtual lanes to produce a corresponding scrambled digital data sequence, at least two of the plurality of scramblers using different scrambler seed values from each other;

a multiplexer to interleave the scrambled digital data sequences produced by the plurality of scramblers and outputting an interleaved scrambled digital data sequence;

reset circuitry to simultaneously reset each of the scramblers with its corresponding scrambler seed value prior to scrambling the respective digital data sequences;

a controller to combine the interleaved scrambled digital data sequence with an alignment sequence containing information indicating an interleave alignment of the plurality of virtual lanes, wherein the alignment sequence comprises a plurality of alignment sub-sequences, each corresponding to one of the scrambled digital data sequences; and a plurality of alignment sequence generators to respectively generate the plurality of alignment sub-sequences, the controller combining the alignment sub-sequences with their respective scrambled digital data sequences such that the multiplexer also interleaves the alignment sub-sequences.

31. The multi-channel coder of claim 30, each alignment sequence generator having a corresponding set of alignment code registers containing alignment codes to be used in generating alignment sub-sequences, at least one set of the alignment code registers containing a different alignment code set than another set of the alignment code registers.

32. The multi-channel coder of claim 31, wherein the alignment codes comprise 8b/10b comma characters.

33. The multi-channel coder of claim 30, wherein the scramblers implement $x^{29}+x^{19}+1$ scrambling.

34. The multi-channel coder of claim 30, wherein the scramblers implement 64b/66b scrambling.

35. The multi-channel coder of claim 30, wherein the scramblers comprise at least two scramblers using two different scrambling polynomials.

* * * * *